US006640916B2

(12) United States Patent
Schaffner et al.

(10) Patent No.: US 6,640,916 B2
(45) Date of Patent: *Nov. 4, 2003

(54) MID-WHEEL DRIVE POWER WHEELCHAIR

(75) Inventors: Walter E. Schaffner, Shavertown, PA (US); James P. Mulhern, Hunlock Creek, PA (US); Stephen J. Antonishak, Alden, PA (US)

(73) Assignee: Pride Mobility Products, Corporation, Exeter, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/772,133

(22) Filed: Jan. 29, 2001

(65) Prior Publication Data
US 2001/0011613 A1 Aug. 9, 2001

Related U.S. Application Data

(63) Continuation of application No. 09/370,132, filed on Aug. 6, 1999, now Pat. No. 6,199,647, which is a continuation of application No. 08/748,214, filed on Nov. 12, 1996, now Pat. No. 5,944,131, which is a continuation-in-part of application No. 08/742,972, filed on Nov. 1, 1996, now Pat. No. 6,176,335, which is a continuation-in-part of application No. 29/056,607, filed on Jul. 3, 1996, now Pat. No. Des. 397,645.

(51) Int. Cl.[7] .................................................. B60K 1/00
(52) U.S. Cl. ........................................ 180/65.1; 180/907
(58) Field of Search ............................. 280/250.1, 304.1; 297/DIG. 4, 423.26, 423.34, 423.36; 180/65.1, 907, 6.48, 6.5

(56) References Cited

U.S. PATENT DOCUMENTS

| 3,876,041 | A |   | 4/1975 | Pivacek |          |
|-----------|---|---|--------|---------|----------|
| 3,902,758 | A |   | 9/1975 | Pivacek |          |
| 3,952,822 | A |   | 4/1976 | Udden et al. |     |
| 3,953,054 | A | * | 4/1976 | Udden et al. | 280/250.1 |

(List continued on next page.)

FOREIGN PATENT DOCUMENTS

| AT | 85 02 091 | 5/1986 |
| AT | 86 00 500 | 6/1987 |
| DE | 27 03 727 | 8/1978 |

(List continued on next page.)

OTHER PUBLICATIONS 8 page brochure entitled "Permobil Power Chairman Empowering the Human Spirit" (1995–1996).
16 page brochure entitled "Bodypoint Designs Winter Catalog 1995–1996" Copyright 1995.
4 page brochure entitled "ORTHOFAB V.I.P. Mobility for Everyone" (1995–1996).
4 page brochure entitled "Permobil for Kids" (1995–1996).
6 page brochure entitled "Quickie Power Products" (1995–1996).
8 page brochure entitled "Ligtvoet Products—Ligtvoet Modern Design" (1995–1996).
6 page brochure entitled "Action Power Cruiser 4E" (1995–1996).

(List continued on next page.)

Primary Examiner—Brian L. Johnson
Assistant Examiner—Bryan Fischmann
(74) Attorney, Agent, or Firm—Drinker Biddle & Reath LLP

(57) ABSTRACT

A mid-wheel drive power wheelchair is provide having a pair of drive wheels on the support frame below the seat. Castor wheels are positioned behind the drive wheels and rearward of the seat. A pair of anti-tip idler wheels are positioned forward of the drive wheels on opposite sides of the frame. The anti-tip wheels are normally positioned off the ground when the drive wheels and the castor wheels are in their normal ground-engaging position. The anti-tip wheels have a resilient mounting comprising a support arm attached at a rear end to the frame. The forward positioned anti-tip wheels are movable upwardly about the attachment of the support arm, with the suspension resiliently resisting such movement, in response to the engagement with a curb or obstruction or in response to a forward pitching of the chair about the drive wheels.

10 Claims, 15 Drawing Sheets

U.S. PATENT DOCUMENTS

| | | |
|---|---|---|
| 4,078,817 A | 3/1978 | Ferguson et al. ........... 280/5.28 |
| 4,082,348 A | 4/1978 | Naury ................. 280/242 WC |
| 4,310,167 A | 1/1982 | McLaurin |
| 4,387,325 A | 6/1983 | Klimo |
| 4,424,873 A | 1/1984 | Terlaak |
| 4,500,102 A | 2/1985 | Haury et al. |
| 4,511,825 A | 4/1985 | Klimo |
| 4,513,832 A | 4/1985 | Engman |
| 4,538,857 A | 9/1985 | Engman |
| 4,555,121 A | 11/1985 | Lockard et al. |
| 4,595,212 A | 6/1986 | Haury et al. |
| 4,634,941 A | 1/1987 | Klimo |
| 4,721,321 A | 1/1988 | Haury et al. |
| 4,805,925 A | 2/1989 | Haury et al. |
| 4,813,693 A | 3/1989 | Lockard et al. |
| 4,840,390 A | 6/1989 | Lockard et al. |
| 4,887,830 A | 12/1989 | Fought et al. |
| D305,521 S | 1/1990 | Wiatrak et al. |
| 4,981,305 A | 1/1991 | Lockard et al. |
| 4,989,890 A | 2/1991 | Lockard et al. |
| 5,033,793 A | 7/1991 | Quintile |
| 5,094,310 A | 3/1992 | Richey et al. |
| 5,121,938 A | 6/1992 | Gross et al. |
| 5,145,020 A | 9/1992 | Quintile et al. |
| 5,154,251 A | 10/1992 | Fought |
| 5,170,826 A | 12/1992 | Carstensen et al. |
| 5,183,133 A | 2/1993 | Roy et al. |
| 5,195,803 A | 3/1993 | Quintile |
| 5,203,610 A | 4/1993 | Miller |
| 5,263,728 A | 11/1993 | Patel et al. |
| 5,294,141 A | 3/1994 | Mentessi et al. |
| 5,366,037 A | 11/1994 | Richey |
| 5,378,045 A | 1/1995 | Siekman et al. |
| 5,413,187 A * | 5/1995 | Kruse et al. ................ 180/65.1 |
| 5,435,404 A | 7/1995 | Garin, III |
| 5,439,240 A * | 8/1995 | Tichenor et al. ......... 280/250.1 |
| 5,442,823 A | 8/1995 | Siekman et al. |
| 5,445,233 A | 8/1995 | Fernie et al. |
| D365,786 S | 1/1996 | Peterson |
| D365,787 S | 1/1996 | Peterson et al. |
| D365,788 S | 1/1996 | Peterson |
| 5,531,284 A * | 7/1996 | Okamoto .................... 180/65.1 |
| 5,540,297 A | 7/1996 | Meier |
| 5,575,348 A | 11/1996 | Goertzen et al. |
| 5,592,997 A | 1/1997 | Ball |
| 5,690,185 A | 11/1997 | Sengel |
| 5,697,465 A | 12/1997 | Kruse |
| 5,727,802 A | 3/1998 | Garven et al. |
| 5,848,658 A * | 12/1998 | Pulver ....................... 180/65.1 |
| 5,853,059 A | 12/1998 | Goertzen et al. |
| 5,944,131 A | 8/1999 | Schaffner et al. ........... 180/907 |
| 5,964,473 A * | 10/1999 | Degonda et al. ......... 280/250.1 |
| 5,988,304 A * | 11/1999 | Behrendts ................... 180/65.1 |
| 6,070,898 A | 6/2000 | Dickie et al. ............. 280/304.1 |
| 6,073,951 A * | 6/2000 | Jindra et al. ............. 280/304.1 |
| 6,105,706 A * | 8/2000 | Cooper ....................... 180/282 |
| 6,129,165 A * | 10/2000 | Schaffner et al. .......... 180/65.1 |
| 6,179,076 B1 * | 1/2001 | Fernie et al. ............... 180/65.1 |
| 6,196,343 B1 * | 3/2001 | Strautnieks ................... 180/22 |
| 6,199,647 B1 * | 3/2001 | Schaffner et al. .......... 180/65.1 |
| 6,220,382 B1 * | 4/2001 | Kramer, Jr. et al. ....... 180/65.5 |
| 6,357,793 B1 * | 3/2002 | Dickie et al. ........ 280/250.1 X |
| 6,533,306 B2 * | 3/2003 | Watkins .................... 280/304.1 |
| 6,543,798 B2 * | 4/2003 | Schaffner et al. ........ 280/250.1 |
| 6,554,086 B1 * | 4/2003 | Goertzen et al. .......... 180/65.1 |

FOREIGN PATENT DOCUMENTS

| | | |
|---|---|---|
| DE | 92 03 878.6 | 6/1992 |
| EP | 0 338 689 | 10/1989 |
| FR | 2 215 054 | 10/1974 |
| FR | 2 383 822 | 11/1978 |
| FR | 2 399 822 | 4/1979 |
| FR | 2 455 886 | 5/1979 |
| GB | 1 447 961 | 9/1976 |
| GB | 2 132 954 | 7/1984 |
| GB | 2 265 868 | 10/1993 |
| GB | 2 311 970 | 10/1997 |
| JP | 58-63575 A | 4/1983 |
| WO | WO 87/06205 | 10/1987 |
| WO | WO 90/06097 | 6/1990 |
| WO | WO 91/17077 | 11/1991 |
| WO | WO 96/15000 | 5/1996 |
| WO | WO 96/15752 | 5/1996 |

OTHER PUBLICATIONS 4 page brochure entitled "Aldersley Excell—The first of its kind!" (1995–1996).
6 page price list entitled "Are You Looking for a New Electric Wheelchair?" by Battery Chairs Limited, 24/26 Old Meeting Road, Coseley, West Midlands WV14 8HB, United Kingdom (1995–1996).
2 page flyer entitled "Little Dipper" (1995–1996).
2 page flyer entitled "Boing! Colours by Permobil" (1995–1996).
2 page flyer entitled "Eclipse Colours 'N Motion!" (1995–1996).
2 page flyer entitled "Impact Colours 'N Motion!" (1995–1996).
2 page "OrderForm" entitled "Colours by Permobil" for "The Avenger" (1995–1996).
2 page "OrderForm" entitled "Colours by Permobil" for "The Boing!" (1995–1996).
2 page "OrderForm" entitled "Colours by Permobil" for "The Supernova Xtreme" (1995–1996).
2 page "OrderForm" entitled "Colours by Permobil" "The Eclipse" (1995–1996).
2 page "OrderForm" entitled "Colours by Permobil" for "The G–Force" (1995–1996).
2 page "OrderForm" entitled "Colours by Permobil" for "The Impact" (1995–1996).
2 page "OrderForm" entitled "Colours by Permobil" for "The Little Dipper" (1995–1996).
5 page brochure entitled "LaBac Introduces it's Tilt, ASB, and RSR on the Quickie P300 with 20" Wheels (1995–1996).
8 page order form entitled "Kid–Kart Cares About Kids" (1995–1996).
2 page flyer entitled "Hoveround Personal Mobility Vehicles" (1995–1996).
2 page flyer entitled "Chairman MPS Permobil Multi Position System" (1995–1996).
2 page Permobil order form entitled "Chair.Man MINI FLEX" (1995–1996).
2 page Permobil order form entitled "Chair.Man STANDER" (1995–1996).
2 page Permobil order form entitled "Chair.Man MPS" (1995–1996).
2 page Permobil order form entitled "Chair.Man CORPUS" (1995–1996).
2 page Permobil order form entitled "Chair.Man ROBO" (1995–1996).
2 page Permobil order form entitled "Chair.Man MINI STANDER" (1995–1996).
1 page announcement entitled "Thank You for Your Interest in Permobil's Power Mobility Products!" (1995–1996).
1 page article entitled "Designer's Corner—All–Terrain Wheelchair" (Feb. 24, 1992).

* cited by examiner

MID-WHEEL DRIVE POWER WHEELCHAIR

CROSS-REFERENCE TO RELATED PATENT APPLICATIONS

This patent application is a continuation of application Ser. No. 09/370,132, filed Aug. 6, 1999, now U.S. Pat. No. 6,199,647, which is a continuation of application No. 08/748,214, filed Nov. 12, 1996, now U.S. Pat. No. 5,944,131, which is a continuation-in-part of application Ser. No. 08/742,972, filed Nov. 1, 1996, now U.S. Pat. No. 6,176,335, which is a continuation-in-part of application Ser. No. 29/056,607, filed Jul. 3, 1996, now U.S. Design Pat. No. 397,645. All of these prior applications are incorporated herein in their entirety.

FIELD OF THE INVENTION

This invention relates to powered wheelchairs for use by handicapped and disabled persons.

BACKGROUND OF THE INVENTION

Power wheelchairs are known and have been the subject of increasing development efforts to provide handicapped and disabled persons with independent mobility to assist handicapped and disabled persons in leading more normal lives.

Power wheelchairs known heretofore have, for the most part, resembled conventional, manual wheelchairs; indeed, many such power wheelchairs have merely been conventional wheelchairs equipped with motors. Use of such power wheelchairs sometimes results in the user feeling a stigma associated therewith in that unthoughtful persons may view the power wheelchair user in a quizzical or even offensive manner.

Additionally, known power wheelchairs suffer in that they tend to be large and are not particularly maneuverable. These large, difficult to maneuver power wheelchairs present difficulties for the power wheelchair user in navigating within conventional dwellings which have not been modified to accommodate such conventional power wheelchairs.

Typical conventional rear wheel drive power wheelchairs which are little more than manual wheelchairs equipped with motors, have turning circles of about 72 inches in diameter, whereas typical front wheel drive power wheelchairs known heretofore have, for the most part, turning circles in the neighborhood of 52 inches in diameter. These turning circles are too big for the user of a conventional power wheelchair to reverse the wheelchair direction by turning the wheelchair around within the corridor or hallway of a conventional office building or most homes.

Dual drive motor power wheelchairs are known; one is illustrated in U.S. Pat. No. 5,540,297. Other power wheelchairs are disclosed in U.S. Pat. Nos. 4,513,832; 4,538,857; 5,094,310; 5,145,020 and 5,366,037.

Front wheel drive power wheelchairs are sold by Permobile, Inc. in Woburn, Mass. and typically have the driving front wheels at the extreme forward end of the vehicle chassis thereby requiring substantial space in order to turn the front wheel drive power wheelchair because the axis of rotation of the chair, upon turning, is at the mid-point of the drive wheel axes, which is at the extreme forward end of the chair.

SUMMARY OF THE INVENTION

In one of its aspects this invention provides a power wheelchair having a frame, a seat supported by the frame, a pair of drive wheels connected to the frame and rotatable about a transverse axis below a central portion of the seat with the drive wheel axis and seat positioned so that the drive wheel axis is forward of the cranial center of perception of a user of the power wheelchair.

In another of its aspects the invention provides a power wheelchair with the seat positioned so that the drive wheel axis is under and perhaps only slightly longitudinally ahead of the cranial center of perception of user of the power wheelchair.

In yet another of its aspects this invention provides a power wheelchair in which the drive wheel axis is at a substantially common longitudinal location with the center of cranial perception when the wheelchair user occupies the seat.

In yet another of its aspects this invention provides a power wheelchair in which the drive wheel axis is forward of the eyes of the wheelchair user when the wheelchair user is seated upright in the seat.

In yet another of its aspects this invention provides a power wheelchair in which the drive wheel axis is longitudinally intermediate of the power wheelchair user's center of cranial perception and a manual control by which the power wheelchair user controls the power wheelchair.

In yet another of its aspects this invention provides a power wheelchair in which the wheelchair user's cranial center of perception is at substantially a common longitudinal location with the center of gravity of the power wheelchair when the chair is unoccupied.

In yet another of its aspects this invention provides a power wheelchair in which a control joystick is used for single manual control of the wheelchair by the power wheelchair user and the drive wheel axis is longitudinally intermediate of the power wheelchair user's center of cranial perception and the control joystick by which the power wheelchair user controls the power wheelchair when the wheelchair user is seated upright in the power wheelchair.

DETAILED DESCRIPTION OF THE DRAWINGS

Figure 1:
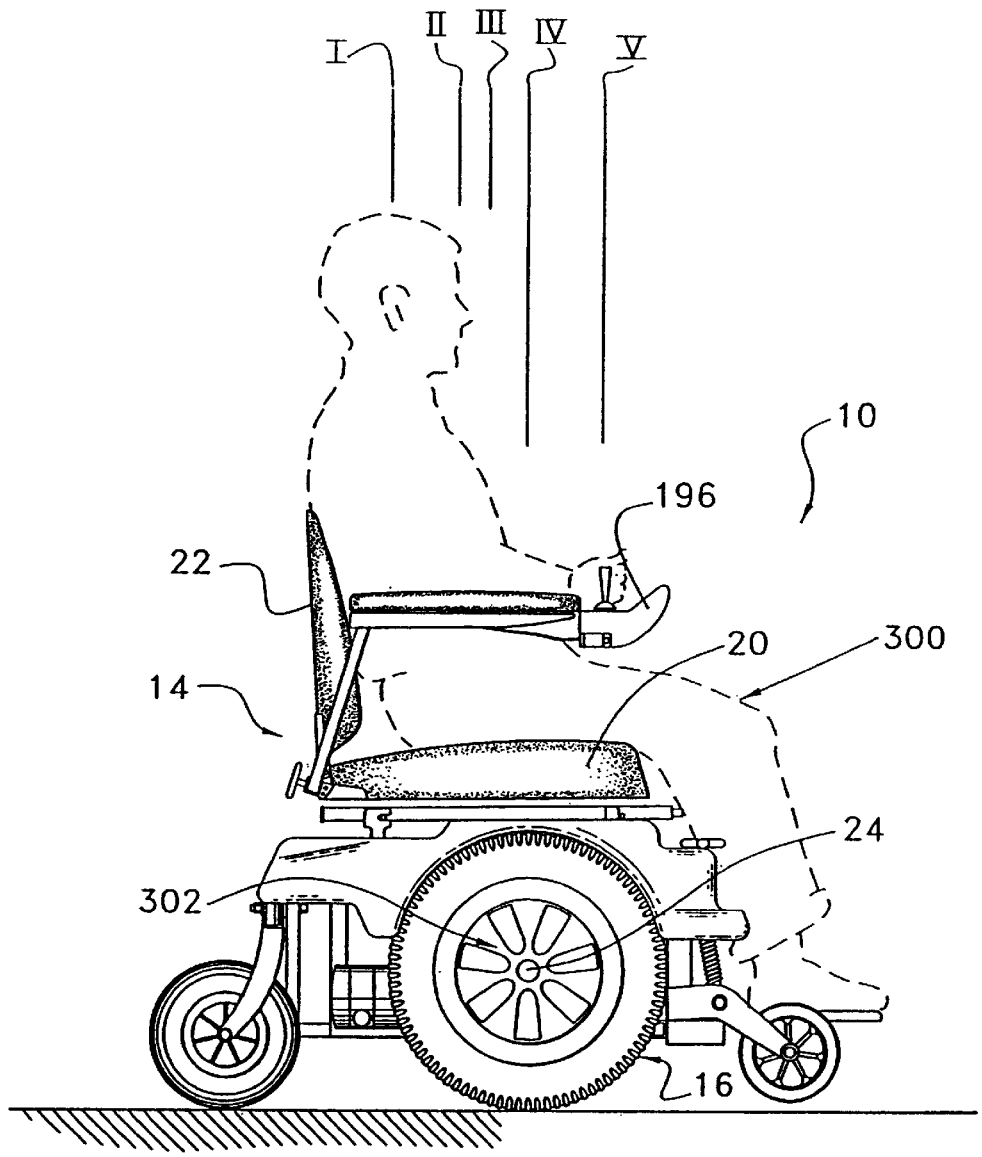
FIG. 1 is a right side elevation of a front wheel drive power wheel chair in the preferred embodiment of the invention with the wheelchair user depicted in dotted lines in an erect seated position using.
Figure 2:
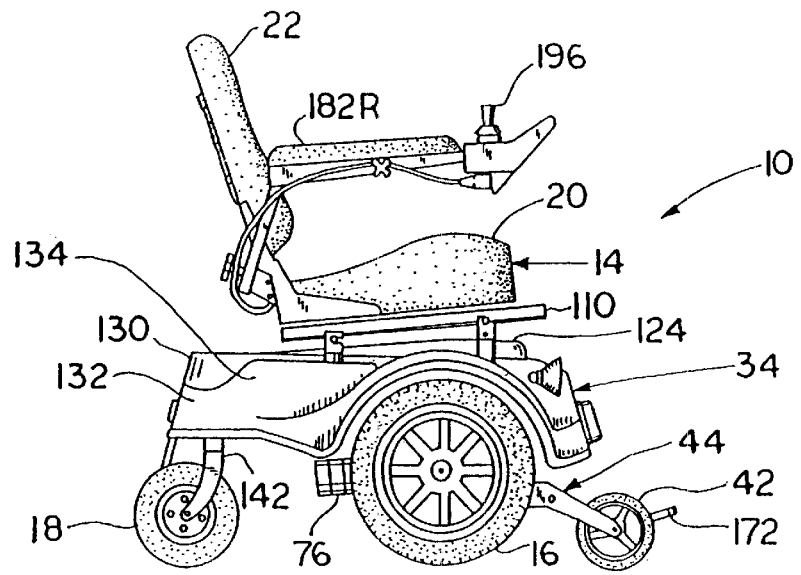
FIG. 2 is a right side view of a prototype power wheelchair manifesting aspects of the invention.
Figure 3:
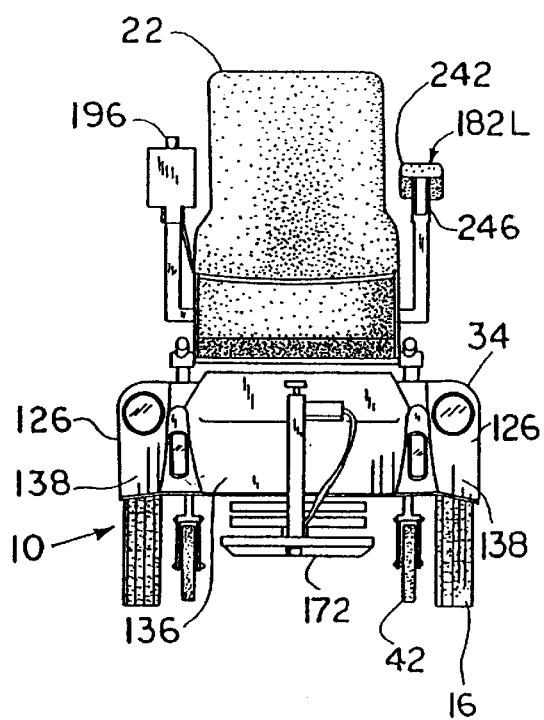
FIG. 3 is a front elevation of the power wheelchair shown in FIG. 1, manifesting aspects of the invention.

Referring to the drawings in general and to FIGS. 1 and 15 through 21 in particular, where like numerals identify like elements, a power wheelchair manifesting aspects of the invention is illustrated therein and is designated generally by the number 10. Power wheelchair 10 includes a frame, illustrated in FIG. 20, which is designated generally as 12 and a seat designated generally as 14 supported by frame 12. Power wheelchair 10 further includes a pair of drive wheels each of which has been designated generally as 16, which are rotatably connected to frame 12 and are rotatable about transverse axes under a central portion of seat 14.

The inventor in developing the configuration and geometry of the power wheelchair recognized that human beings have a center of perception located within the skull, referred to herein as the "cranial center of perception".

The cranial center of perception is generally perceived by a person to be located behind one's eyes, centrally located from left to right within the head and at a front to back location approximately even with the ear opening.

The cranial center of perception provides a point of reference for all human beings respecting body movement. All human beings find body movements easier where such movements are with in the cranial center of perception.

The inventor, recognizing the desirability of all human beings to have a relatively stationary cranial center of perception as a reference point for body movement, further recognized that a power wheelchair with the driving axis of the drive wheels substantially under and supporting the weight of the wheelchair user and with the drive wheel axis (which defines the center of rotation for the power wheelchair when the power wheelchair is making a u-turn, due to the action of the drive wheels with one wheel turning forwardly and the other wheel turning rearwardly) ahead of the wheelchair user's cranial center of perception and preferably ahead of the wheelchair user's eyes, makes the power wheelchair easier to maneuver for a wheelchair user, especially a disabled or handicapped wheelchair user.

Figure 15:
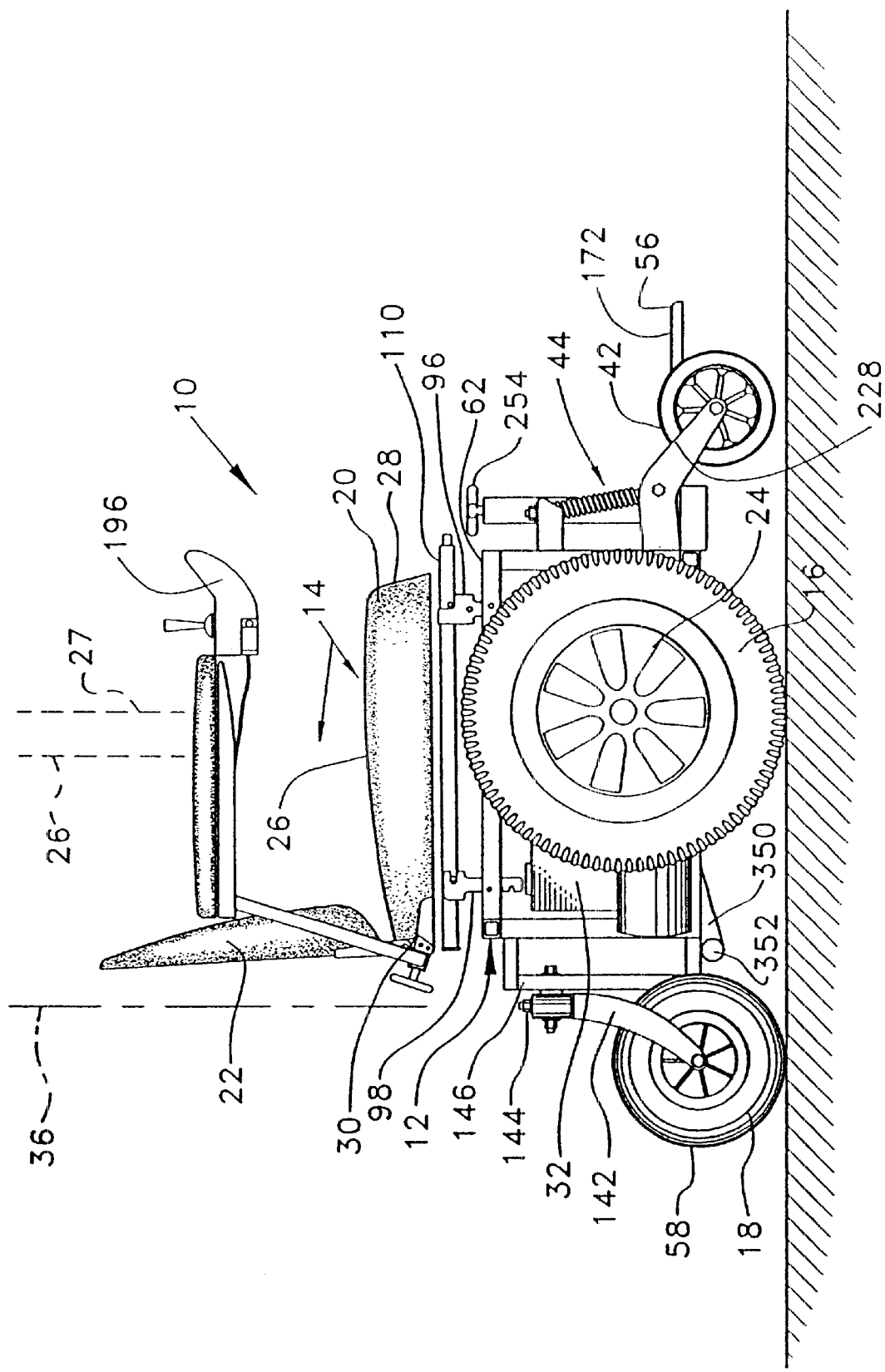
FIG. 15 is a side view of the preferred embodiment of a power wheelchair illustrated in FIG. 1 and manifesting many aspects of the invention in common with the power wheelchair embodiment as generally illustrated in FIGS. 2 through 14 as described above, but with the power wheelchair body removed to reveal internal structure and mechanical details.

This has been accomplished by careful positioning of the power wheelchair components, specifically the power wheelchair drive wheels and the power wheelchair seat. As illustrated in FIG. 15, in the power wheelchair the seat 14 has a cushion portion 20 for supporting a wheelchair user's thighs and the lower portion of the wheelchair user's buttocks. The seat 14 further includes a back portion 22 for supporting the wheelchair user's back, With the seat having cushion and back portions, the wheelchair user is positioned in a seated upright position when using the wheelchair as illustrated in FIG. 1.

In this position the wheelchair user's cranial center of perception is located above and preferably longitudinally slightly behind the axis of rotation of the drive wheels of the power wheelchair. The drive wheels 16 in general and specifically the axis 24 about which the drive wheels are rotated is below a central portion of the wheelchair seat 14, specifically below a central portion of the cushion. This arrangement results in the drive wheel axis being longitudinally just slightly ahead of the center of cranial perception when the wheelchair user occupies the wheelchair seat.

It is also desirable to have the axis of rotation of the power wheelchair embodying the invention located longitudinally just slightly ahead of the cranial center of perception and just slightly ahead of the eye position of the power wheelchair user. In a power wheelchair embodying the invention as illustrated in the drawings, the vertical axis or turning axis of rotation of the power wheelchair is coincident with the axis of rotation of the drive wheels; the drive wheels can turn the chair about a stationary vertical axis, which intersects the transverse or horizontal axis of rotation of the drive wheels, by having one wheel rotate backwardly while the other wheel rotates forwardly. This causes the chair to turn about a vertical axis running through the drive wheel axis. With this turning capability in the power wheelchair embodying the invention it is desirable for the user of the power wheelchair to be positioned with the user's eyes slightly behind the longitudinal location of the drive wheel axis or, less preferably, with the user's eyes essentially at the same longitudinal position as the drive wheel axis.

In FIG. 1 of the drawings a wheelchair user is depicted in the wheelchair embodying aspects of the invention where the wheelchair user is depicted in dotted line and is designated generally as 300. The wheelchair user 300 is depicted seated in a wheelchair designated generally as 10 which embodies the invention. In FIG. 1 the center of gravity of wheelchair 10, which has been computed with the wheelchair in the unoccupied condition, is designated generally 302.

In FIG. 1 a series of vertical lines have been provided to indicated the relative longitudinal position of parts of wheelchair 10 and wheelchair user 300. These vertical lines are identified with Roman Numerals I through V in FIG. 1.

Specifically in FIG. 1 the longitudinal location of the cranial center of perception of the wheelchair user 300 is identified with vertical position line I. The longitudinal location of the wheelchair user's eyes is denoted by longitudinal position line designated generally II in FIG. 1. The longitudinal position line designated generally III in FIG. 1 identifies the longitudinal location of the center of gravity 302 of power wheelchair 10, when power wheelchair 10 is unoccupied.

Longitudinal position line IV identifies the longitudinal location of the axis of rotation of the drive wheels 16 of power wheelchair 10. Longitudinal position line V in FIG. 1 identifies the longitudinal location of the joystick controller operated by single hand operation by wheelchair user 300.

Of course, the distance between the wheelchair user's eyes and the axis of rotation of wheelchair drive wheels 16, as measured by the longitudinal separation of position lines II and IV in FIG. 1 varies with the position and posture and physical size of the wheelchair occupant. When the wheelchair occupant is a male having a height of about 6 feet 3 inches and an average to slender torso, the longitudinal distance between the wheelchair user's eyes and the axis of rotation of wheelchair drive wheels 16 ranges from about (8 ½") eight and one-half inches down to about (1") one inch, depending on how erect is the posture of the wheelchair user. The more erect the wheelchair user's posture, the further the wheelchair user's eyes are longitudinally behind the longitudinal location of the axis of drive wheels 16 of wheelchair 10.

For a woman standing approximately 5 feet 3 inches in height, the longitudinal separation between a female wheelchair user's eyes and the axis of rotation of wheelchair drive wheels 16 ranges from about (6 ½") six and one-half inches down to about (2") two inches, depending upon the posture and degree of forward spending of the wheelchair user. Of course, the more erect the female wheelchair user sits in the wheelchair seat, the further behind, in the longitudinal direction, are the wheelchair user's eyes from the wheelchair drive wheel axis of rotation.

In most persons the distance from longitudinal separation between the wheelchair user's eyes and the wheelchair user's ear opening, which is believed to be substantially coincidental in longitudinal direction with the wheelchair user's cranial center of perception, ranges from about 2 inches to about 3 inches, depending upon whether the wheelchair user is male or female and the size of the wheelchair users head. Hence for the male and female wheelchair user's noted above, the wheelchair user's center of cranial perception is always at least about 3 inches or more behind the longitudinal location of the wheelchair drive wheel axis of rotation 24.

In the preferred embodiment of the wheelchair, the joystick is positioned longitudinally, as indicated by longitudinal position line V, forward of the wheelchair axis of longitudinal axis of rotation by a distance of about 9 inches.

The center of gravity 302 of wheelchair 10 when wheelchair 10 is empty in the preferred embodiment illustrated in FIG. 1 is about 3.1 inches longitudinally behind the axis of rotation 24 of drive wheel 16. This longitudinal location of the wheelchair center of gravity when empty is indicated by longitudinal position line III in FIG. 1.

This arrangement and geometry provides the user of power wheelchair 10 with a vehicle which reacts very much like the wheelchair user's own body. The pivot axis of the power wheelchair is much the same as experienced by a power wheelchair user in navigating normal hallways turns and the like. Specifically, the pivot point for such turning is not behind the user of the power wheelchair when seated in the power wheelchair. The pivot point being coincident with the axis of rotation of the drive wheels of power wheelchair 10 allows the power wheelchair user to drive the power wheelchair and essentially to react to what the user's eyes see. There is very little necessity to align the power wheelchair with narrow openings in advance; the power wheelchair can be driven much like a conventional automobile or like a runner runs with the joystick responding to the power wheelchairs user's eyes and what the power wheelchair user sees. The response in that regard is ergonomic in that the power wheelchair user may rely on what he or she sees ahead and can guide the power wheelchair accordingly with the power wheelchair user pivoting about an axis very nearly coincident with the axis about which the power wheelchair user would pivot the user's torso if the power wheelchair user could walk. This gives a very lifelike perception to the power wheelchair user when guiding the power wheelchair, unlike power wheelchairs known heretofore.

All of this is accomplished by the geometry of the power wheelchair, the seat, the arrangement of the wheels relative to the seat and the positioning of the power wheelchair user on the seat relative to the center of gravity of the power wheelchair, the drive wheels and the axis of rotation thereof.

As is apparent from the drawings, drive wheels 16 of power wheelchair 10 are connected to frame 12 so that each drive wheel 16 rotates about a transverse axis which is below a portion of a cushion portion 20 of the power wheelchair seat designated generally 14, and specifically below the portion of cushion 20 which supports the power wheelchair occupant's thighs. As is apparent from the drawings, drive wheels 16 are rotatable about transverse axes which are slightly forward of the longitudinal mid-point of the wheelchair seat 14 and specifically are rotatable about transverse axes which are slightly forward of the longitudinal mid-point of the seat cushion 20.

Seat 14 is preferably mounted on frame 12 proximate the longitudinal mid-point of frame 12. As is further apparent from the drawings, drive wheels 16 are connected to frame 12 and rotatable with respect thereto about a transverse axis which is under a central portion of frame 12 which is adapted to support seat 14. As is further apparent from the drawings, drive wheels 16 which are rotatably connected to frame 12 are rotatable about a transverse axis which is preferably under a central portion of seat 14. The axes 24 of drive wheels 16 is preferably longitudinally between the mid-point of seat 12 and the seat forward extremity and is preferably closer to the mid-point of seat 14 than to the longitudinal extremity thereof.

Cushion portion 20 of seat 14, is the portion of cushion 20 which supports a seat occupant's buttocks and thighs. The forward portion of the seat cushion supports the occupant's thighs.

Figure 20:
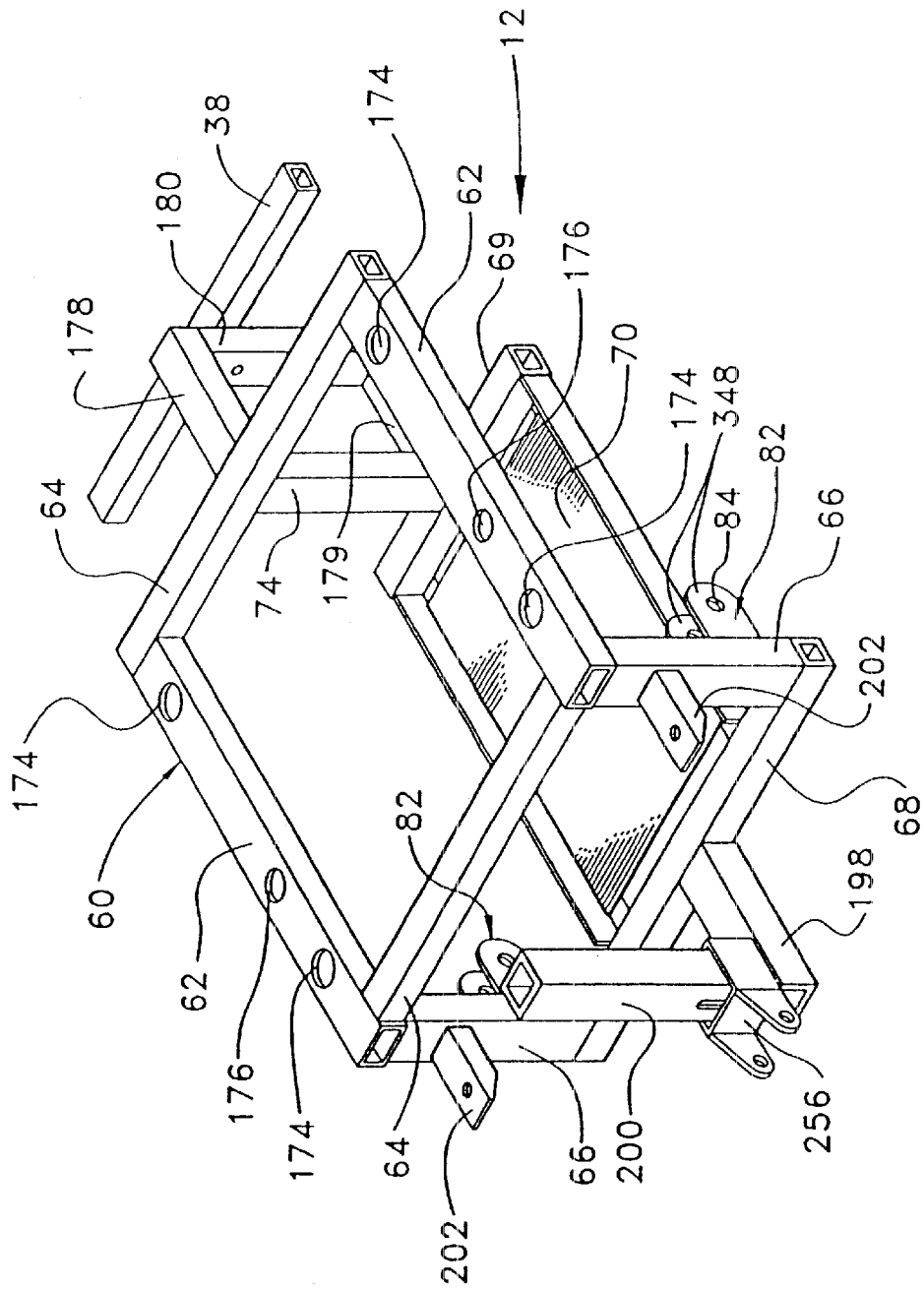
FIG. 20 is an isometric view of the frame of the power wheelchair embodiments illustrated in the figures.
Figure 21:
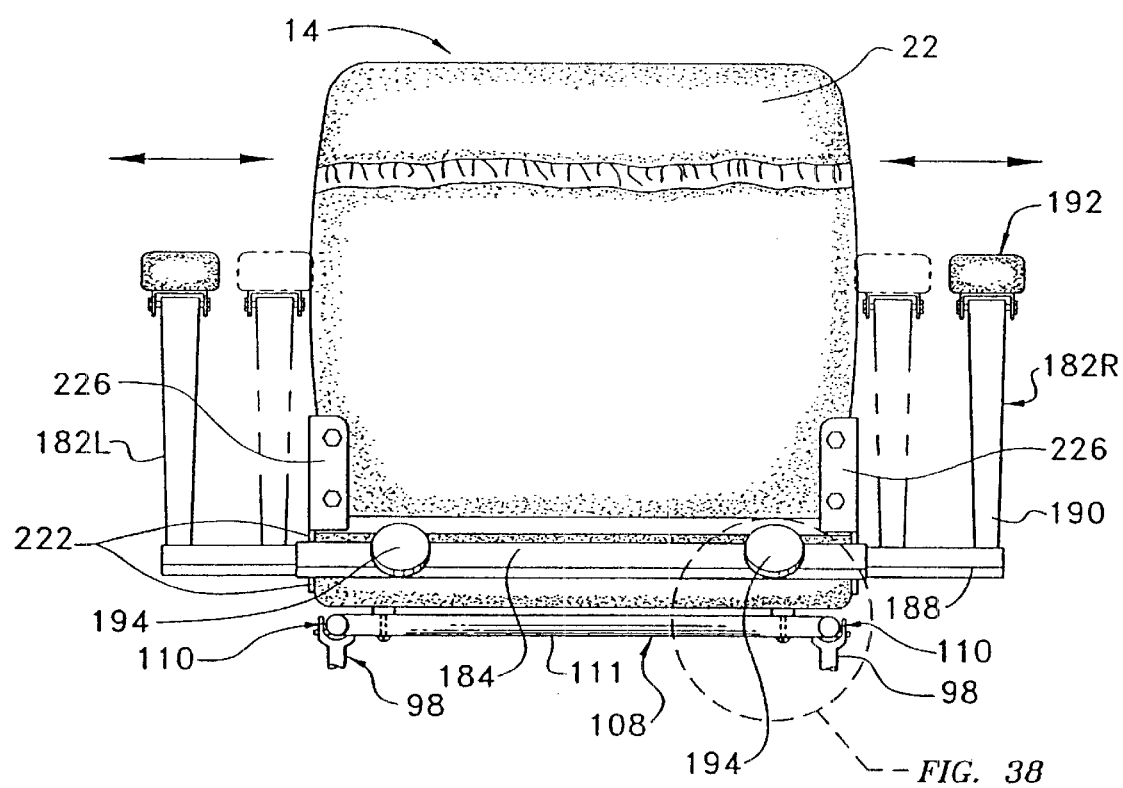
FIG. 21 is a view of the wheelchair seat back looking in the same direction as FIG. 16, illustrating wheelchair seat arm width adjustment aspects of the invention.

Frame 12 is illustrated isometrically in FIG. 20 and has an upper rectangular frame portion designated generally 60 which includes left and right longitudinally extending tubular upper members 62 and forward and rear transversely extending tubular upper members 64. Members 62 and 64 are preferably welded together. As illustrated in FIG. 20, frame 12 is preferably fabricated of hollow tubular rectangular cross-section steel members which are welded together.

Frame 12 further includes a pair of forward vertically downwardly extending members 66 which are preferably welded to and extend downwardly from forward extremities of longitudinally extending tubular upper members 62 as illustrated in FIG. 20. A transversely extending forward lower cross-member 68 is preferably welded to lower extremities of downwardly extending members 66 and extends therebetween.

Preferably welded to and extending vertically downwardly from the center of a rear transversely extending tubular upper member 64 is a rear vertically downwardly extending member 74 forming a portion of frame 12.

A pan 70 for carrying electrochemical means, for powering the motors rotating drive wheels 16, in the form of one or more batteries 72, is preferably welded along its forward edge to forward transversely extending lower cross-member 68. A rear transversely extending lower cross-member 69 is welded to the lower extremity of rear vertically downwardly extending member 74. The rear edge of pan 70 is welded to the forward facing surface of rear transversely extending lower cross-member 69, which is of length equal to the width of pan 70; rear transversely extending lower cross-member 69 is not as long in the transverse direction as transversely extending cross-members 64, 68.

Longitudinally extending tubular upper members 62 preferably have apertures 174 formed therein, preferably by drilling or stamping. Apertures 174 receive front and rear upwardly extending seat support members which provide for manual height and tilt adjustment of the power wheelchair seat without use of tools. Between apertures 174 in longitudinally extending tubular upper members 62 are apertures 176 which are provided for mounting a spring-strut portion of the independent drive wheel suspension means of wheelchair 10.

Frame 12 further includes upper and lower longitudinally extending central tubular members 178, 179 respectively. Upper member 178 is preferably welded to and extends rearwardly from the center of rear upper transversely extending tubular member 64. Lower longitudinally extending central tubular member 179 is preferably welded to and extends rearwardly from the center of the rearwardly facing surface of rear transversely extending cross-member 69, immediately below the point of welding connection between rear vertically downwardly extending member 74 and rear transversely extending lower cross-member 69.

Extending vertically between longitudinally extending central upper and lower tubular members 178, 179 is outboard vertically extending tubular member 180, which is preferably secured to the rear extremities of longitudinally extending members 178, 179 by welding.

Frame 12 further includes a longitudinally extending forward tubular extension member 198 which is secured to transversely extending lower forward cross-member 68 preferably at the center thereof, preferably by welding.

Frame 12 yet further preferably includes a forward upstanding extension member 200 secured by welding to the forward extremity of forward tubular extension member 198 and extending transversely upwardly therefrom as illustrated in FIG. 20.

Frame 12 still yet further preferably includes a pair of eye portions designated generally 82 in FIG. 20 which preferably consist of a pair of parallel plates affixed to rearwardly facing surfaces of respective vertically downwardly extending forward members 66. The plates constituting eye portions 82 include apertures 84 formed therein where apertures 84 are aligned in respective ones of plates forming eye portion 82 so that each pair of plates may receive shafts for independent suspension of drive wheels from eye portions 82 as described below. Eye portions 82, specifically the parallel plate portions thereof, are preferably formed from single pieces of metal by bending the pieces of metal into a U-shaped bracket where the upstanding portions of the "U" define the plates of eye portion 82. The preferred one piece, U-shaped bracket construction of eye portion 82 is visible in FIG. 17.

Frame 12 preferably yet further includes a pair of forwardly extending pedestals 202 which are secured to forwardly facing surfaces of forward vertically downwardly extending members 66, preferably by welding. Pedestals 202 are preferably secured at positions on members 66 somewhat below the upper extremities thereof, as illustrated in FIG. 20. Forwardly extending pedestals 202 provide points of attachment for spring-strut-beam combinations 44 which govern arcuate upward movement of anti-tip wheels 42 relative to frame 12. The spring-strut-beam combinations 44 and anti-tip wheels 42 are not illustrated in FIG. 20 but are shown in FIGS. 15, 17 through 19 and FIGS. 22 through 25.

Pan 70 is preferably welded to a forward portion of rear vertically downwardly extending member 74 as well as to a rear portion of transversely extending lower tubular cross-member 68. The preferably welded, box-like construction of frame 12 as illustrated in FIG. 20 provides a rigid, high strength frame for power wheelchair 10.

As illustrated in FIGS. 1 and 15, drive wheels 16 are preferably oriented and positioned respecting frame 12 so that the axes of rotation of drive wheels 16 are between the longitudinal mid-point and forward extremity of seat 14. Most desirably the axis of rotation of drive wheels 16 is closer to the mid-point of seat 16 than to the forward longitudinal extremity of seat 16.

Seat 14 preferably includes a cushion portion 20 and a back portion 22. In FIG. 15 the longitudinal mid-point of seat 14, specifically the longitudinal mid-point of seat cushion 20, is identified by the numeral 26. The forward longitudinal extremity of seat 14 is identified by the numeral 28 while the rear longitudinal extremity of seat 14 and specifically seat cushion 20 is identified by the numeral 30. The axis of rotation of drive wheel 16 is identified by the numeral 24. In FIG. 15 the longitudinal mid-point 26 of seat 14, specifically of cushion 20 of seat 14, is indicated by both a lead line from an indicator numeral and by a dotted vertical line. The longitudinal location of the axes of rotation of drive wheels 16 is indicated by dotted vertical line 27 in FIG. 15.

Figure 16:
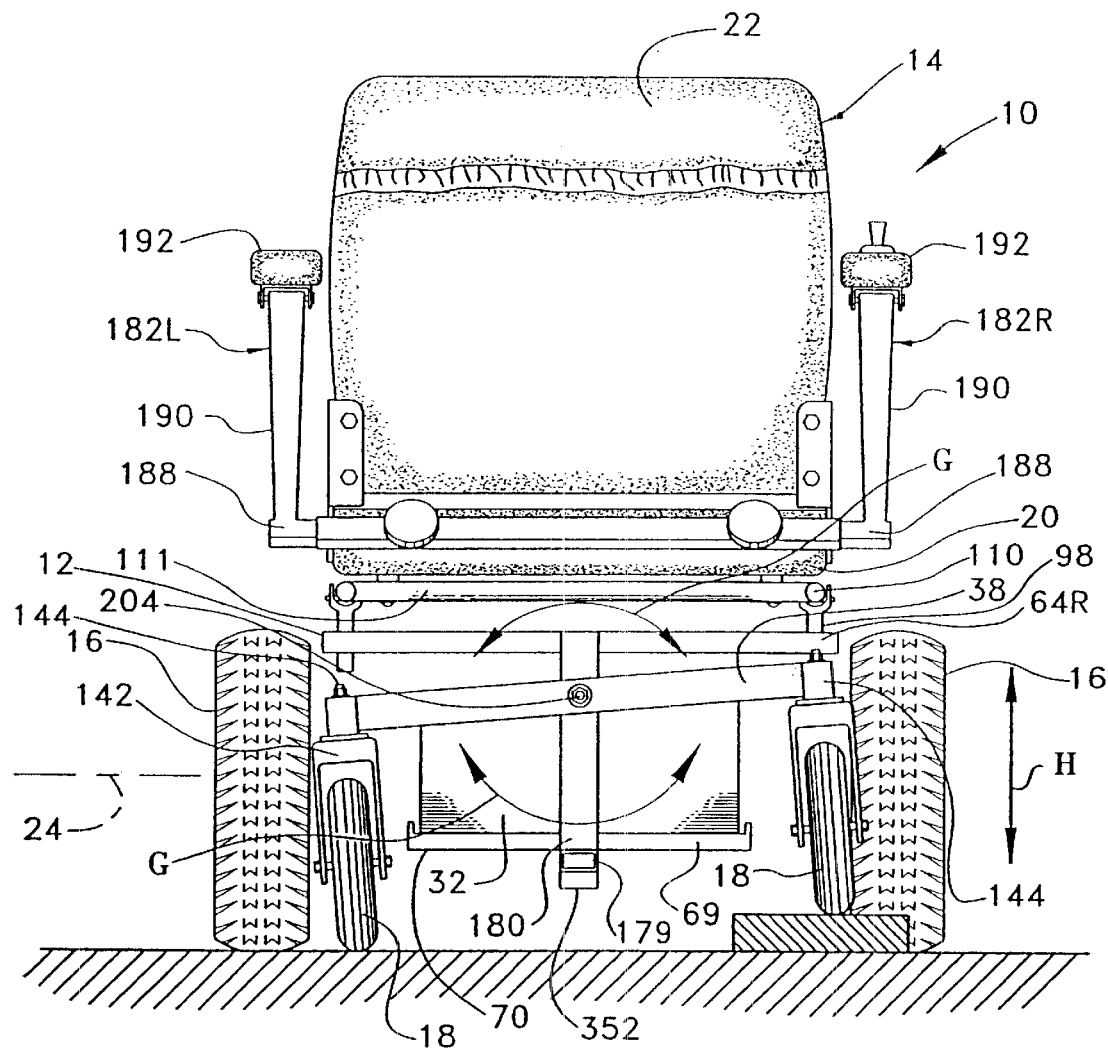
FIG. 16 is a rear view of the power wheelchair illustrated in FIGS. 1 and 15 with the power wheelchair body similarly removed to reveal internal structure and mechanical details.

Power wheelchair 10 further includes at least one battery, which has been designated generally 32, carried by frame 12, specifically by pan 70 as illustrated in FIG. 16. Power wheelchair 10 further includes motors 76 powered by one or more batteries 32 for driving drive wheels 16. Each drive wheel 16 preferably has an associated drive motor 76 associated therewith as illustrated in FIG. 17.

Figure 17:
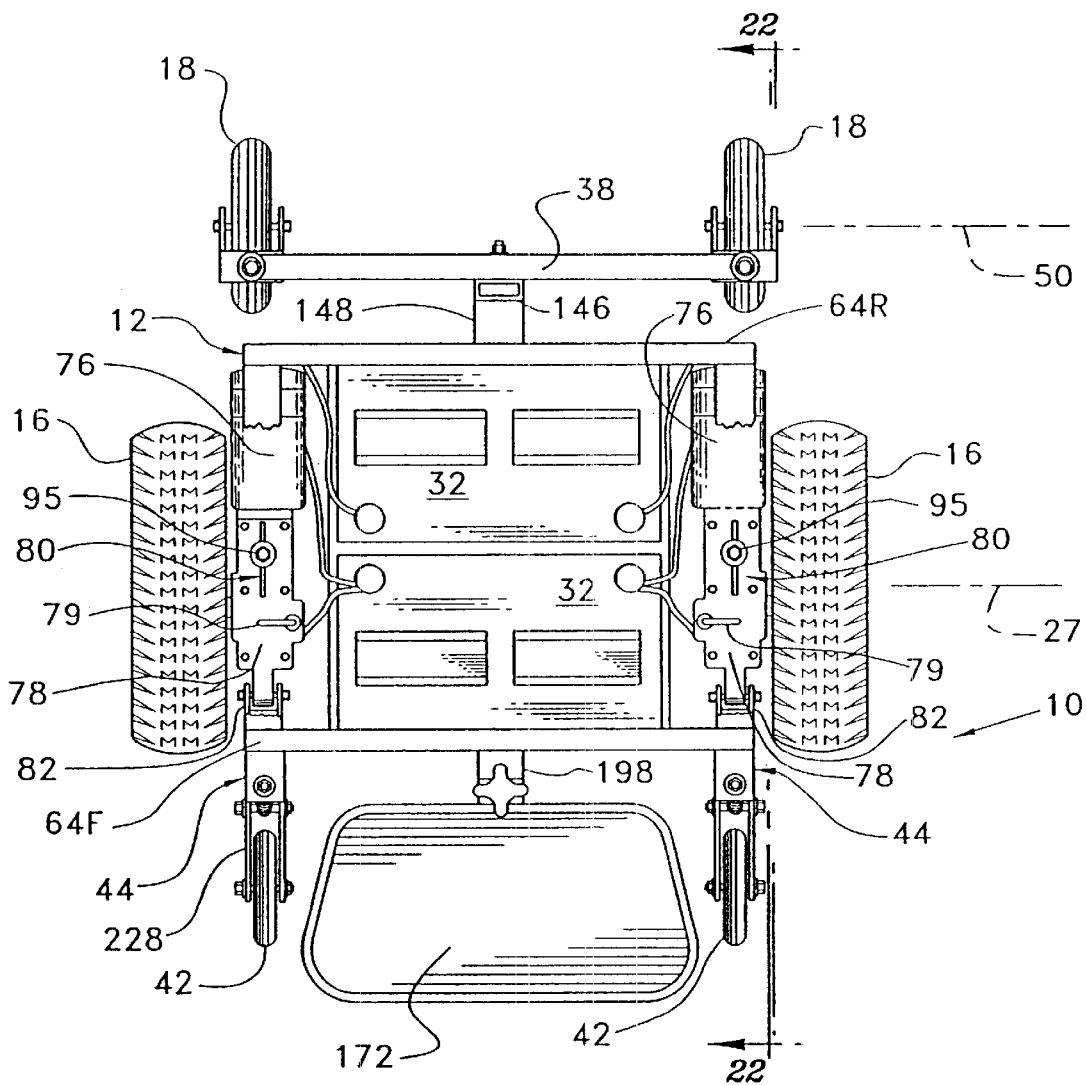
FIG. 17 is a top view of the power wheelchair illustrated in FIGS. 1, 15 and 16 but with the power wheelchair seat and body along with a portion of the frame to reveal internal structure and mechanical details.

As best illustrated in FIGS. 16 and 17, power wheelchair 10 further includes a pair of idler wheels 18 which are the rear ground engaging wheels of power wheelchair 10; drive wheels 16 are the forward ground engaging wheels of power wheelchair 10. In the preferred embodiment of the invention rear ground engaging wheels 18 are caster-type wheels.

The mid wheel drive power wheelchair 10 in the preferred embodiment of the invention as illustrated in the drawings, particularly in the mechanical configuration illustrated in FIGS. 1 and 15 through 20, provides a mid wheel drive power wheelchair with the drive wheels positioned towards the longitudinal center of the power wheelchair vehicle. This configuration concentrates, and is believed to effectively maximize, weight placed on drive wheels 16. A power wheelchair constructed in accordance with FIGS. 15 through 21 and having dimensions as set forth herein as representing the preferred embodiment of the invention, when carrying a 160 pound passenger has about eighty-two percent (82%) of the total weight of the power wheelchair and passenger carried by drive wheels 16.

The configuration illustrated in the drawings, particularly in FIGS. 1 and 15 through 20, positions a large amount of total chair and passenger weight over drive wheels 16, which provides several benefits: Overall traction is increased. With increased traction, better obstacle climbing ability results, increasing overall capability and usability of the power wheelchair. Additionally, with increased traction, deceleration is more positive and more predictable. This is an important safety factor in light of the fact that most, if not all of the users of power wheelchairs manifesting invention will be handicapped and disabled persons.

With increased traction also comes superior straight line stability of the power wheelchair. The mass centralization created by the battery placement and the user position in the power wheelchair contributes to straight line stability by reducing the "pendulum effect" present in many prior art front wheel drive power wheelchairs, where the user and battery weight are both behind the pivot axis of the drive wheels. The "pivot axis" of the drive wheels means the vertical axis about which the power wheelchair turns when the power wheelchair is turned in as tight a turning radius as possible.

Increased traction further results in extremely accurate response by the power wheelchair to the control joystick inputs provided by the wheelchair user. This translates into more predictable and positive handling and a much easier learning curve for the power wheelchair user when the user is first becoming accustomed to the power wheelchair.

Yet another benefit of the geometry and configuration of the components in the preferred embodiment of the invention, as illustrated in FIGS. 1 and 15 through 20, is an extremely tight turning radius. This allows the user of the power wheelchair to gain access to and to turn around in confined areas such as those encountered in hallways, bathrooms, small kitchens and office areas. In the preferred embodiment of the invention as illustrated in FIGS. 1 and 15 through 19 the power wheelchair has an extremely small footprint. Placement of the drive wheels near the center of the power wheelchair results in the power wheelchair having a turning radius of only nineteen and one-half inches (19 ½") in the preferred embodiment of the invention.

Figure 18:
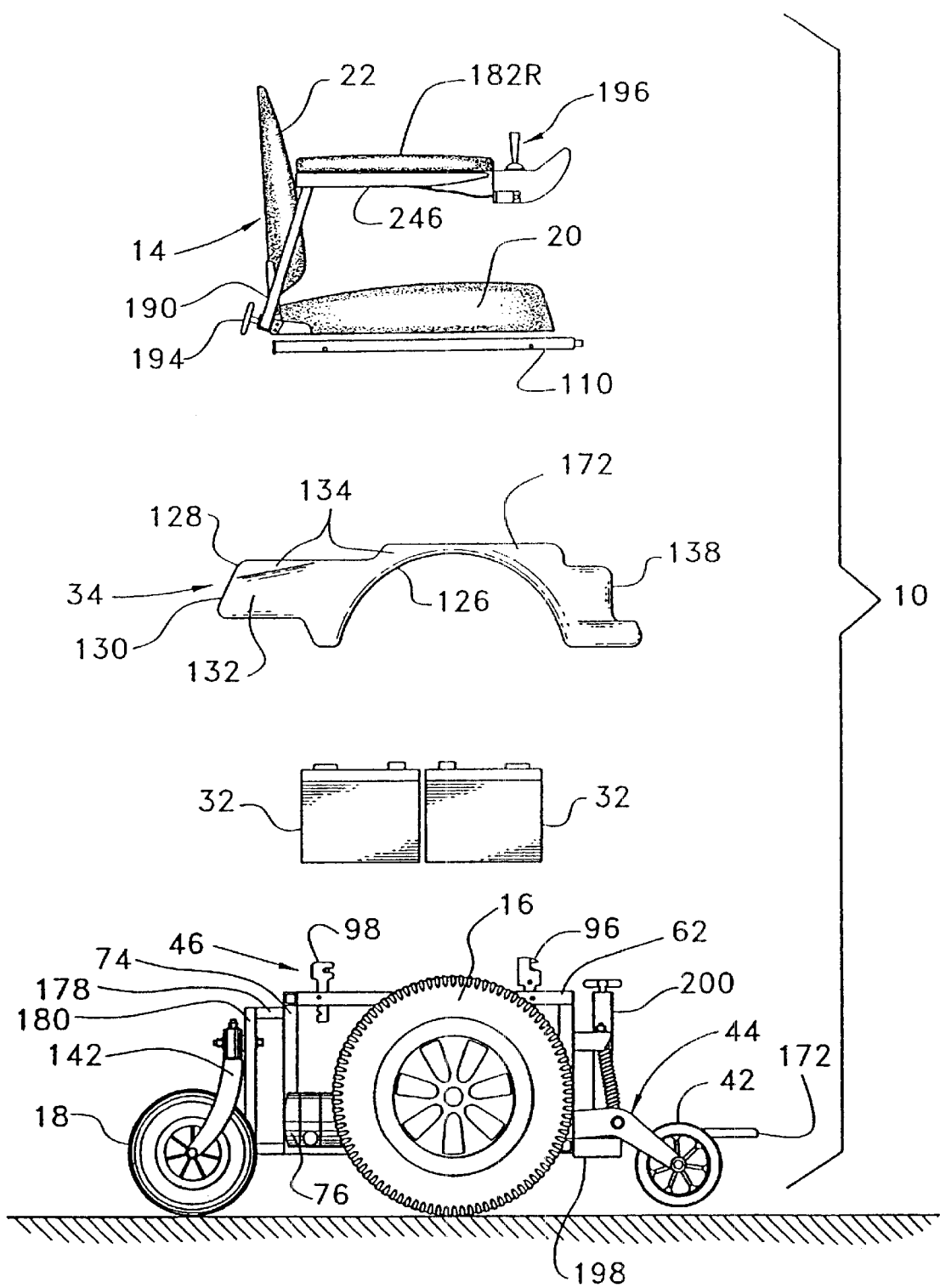
FIG. 18 is an exploded side view of the power wheelchair illustrated in FIGS. 1 and 15 through 17 taken in the same direction as FIGS. 1 and 15 and illustrating the manner in which the power wheelchair batteries, body and seat are assembled with the power wheelchair frame and running gear.
Figure 19:
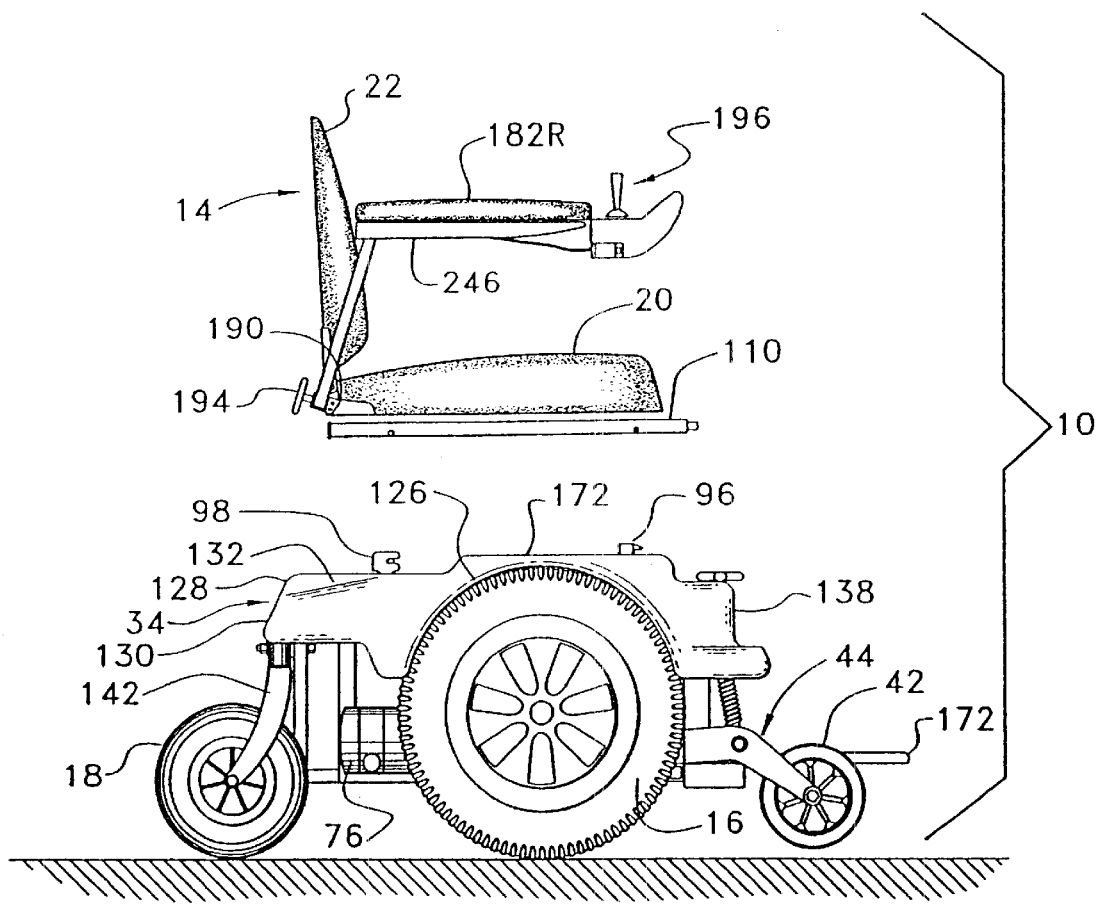
FIG. 19 is a partially exploded side view of the power wheelchair illustrated in FIGS. 1 and 15 through 18 taken looking in the same direction as FIG. 17 with the batteries and wheelchair body in position and supported by the wheelchair frame and with the wheelchair seat illustrated removed from the frame and above the frame/body assembly.

As illustrated in FIGS. 17 and 18, idler wheels 18 located at the rear of power wheelchair 10 are mounted to frame 12 and are pivotable about vertical axes identified by the numeral 36 in FIG. 15. Idler wheels 18 are not powered and are desirably caster-type wheels. Idler wheels 18 are connected to frame 12 behind drive wheels 16 and, preferably, behind seat 14.

As illustrated in FIG. 16 rear idler wheels 18 are connected to a transverse beam 38 via U-shaped spindles 142 which connect to transverse beam 38 via conventional bearing assemblies 144. With this arrangement U-shaped spindles and hence rear idler wheels 18 are pivotable about vertical axes 36 upon wheelchair 10 turning and/or one of rear idler wheels 18 encountering an obstacle such as illustrated in FIG. 16.

Rear idler wheels 18 are rotatably mounted within U-shaped spindles 142 for rotation within the spindles about horizonal axes 50 as illustrated in FIG. 17.

As illustrated in FIG. 16, transverse beam 38 is pivotally connected to frame 12, specifically to the upper portion of outboard vertically extending tubular rear frame member 180. The point of pivotal connection of transverse beam 38 to vertically extending outboard rear frame member 180 is designated 204. Pivotal connection provided at 204 is effectuated using conventional bearings together with a pin journeled in the bearing for pivotally connecting beam 38 to vertical extending frame member 180. Member 180 extends upwardly from a lower longitudinally extending frame rear extension member 179 which in turn extends rearwardly from a rear transversely extending lower cross-member 69 as illustrated in FIG. 20.

Pivotal mounting of transverse beam 38 to vertically extending rear frame member 180 provides a smoother ride in the event wheelchair 10 encounters a bump. As illustrated in FIG. 16, where the right hand one of rear idler wheels 18 has been illustrated encountering an obstacle, as right hand idler wheel 18 rides over the obstacle, beam 38 rotates about pivotal connection 204 as indicated by double ended arrows G in FIG. 16. Vertical displacement of right hand idler wheel 18 is depicted by double ended arrow H in FIG. 15 where this displacement is effectuated by idler wheel 18 encountering the obstacle.

As illustrated in FIG. 17 power wheelchair 10 includes two motors for driving respective drive wheels 16. These motors are designated generally 76 and are each within a rigid housing which houses, in addition to a motor 76, a transmission 78 for transferring driving rotation from an output shaft of motor 76 to an associated drive wheel 16. The drive wheel/motor transmission combination housing is independently suspended from frame 12. Hence each drive wheel 16 is free to move with respect to frame 12 upon encountering an obstacle without the remaining drive wheel 16 moving relative to frame 12. There is no common single axle for drive wheels 16 in the preferred embodiment of the invention.

To facilitate independent suspension of each drive wheel/motor/transmission combination respecting frame 12, frame 12 further includes eye portions 82 which are preferably fixedly connected, preferably by welding, to forward vertical members 66 of frame 12 as illustrated in FIG. 20. Eye portions 82 have apertures 84 formed therein.

Motor 76 and transmission 78 are available from Rockwell Automation in Eden Prairie, Minn. Transmission 78 is a right angle worm drive serving to change the axis about which the driving rotation is provided by motor 76. Specifically, motor 76 is positioned so that the motor output shaft extends longitudinally. Associated transmission 78 through the right angle worm drive provides the driving rotation output via axles, not numbered in the drawings, on which connecting to drive wheel 16.

Each motor 76 drives an associated drive wheel 16 via an associated transmission 78. A shift lever 79 extending out of transmission 78 may be rotated to disengage transmission 78 thereby providing free wheel operation of drive wheels 16. When body 34 is in place on frame 12, shift levers 79 protrude through apertures in body 34 thereby permitting facile switchover from driven to freewheeling operation of drive wheels 16 by the wheelchair operator merely twisting shift lever 79.

Figure 22:
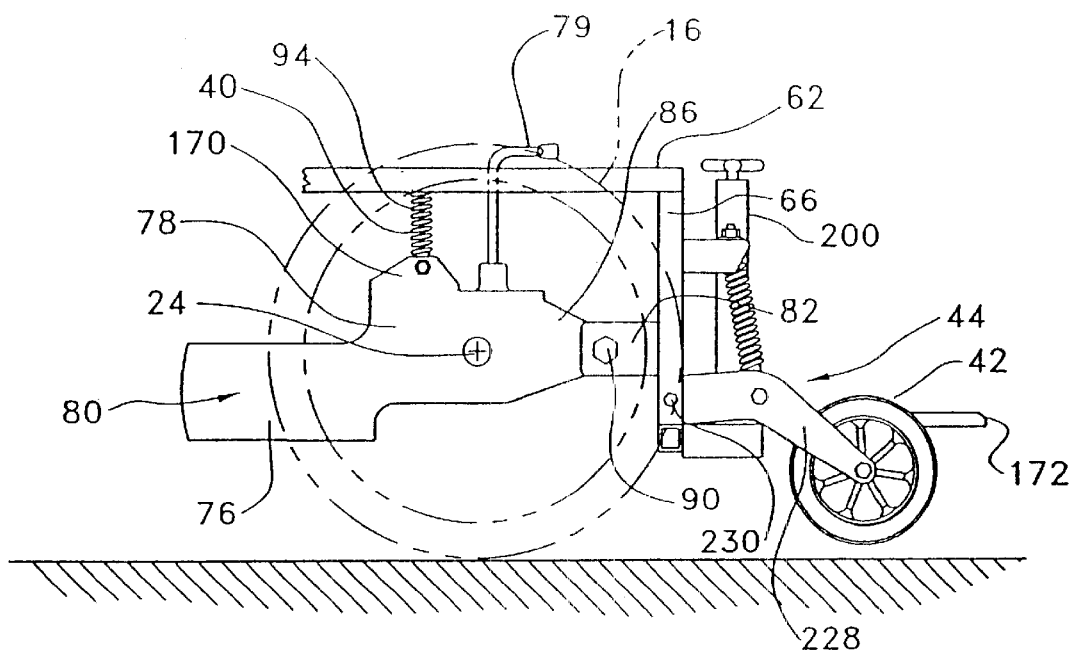
FIG. 22 is a broken side view of the power wheelchair independent drive wheel suspension taken at arrows 22—22 in FIG. 17 with the drive wheel illustrated in phantom.

Motor 76 and transmission 78 are rigidly connected by motor/transmission housing 80. Motor and transmission housing 80 is preferably glass filled nylon, which is extremely strong, provides extremely quiet operation and includes an ear portion 86 extending forwardly therefrom as illustrated in FIG. 22. Ear portions 86 include apertures 88 sized and positioned to be congruent with apertures 84, as illustrated in FIG. 20, so that apertures may be aligned. A pivot pin 90 fits within aligned apertures and permits rotation of housing 80, and hence motor 76 and transmission 78 housed therewithin, relative to frame 12 upon an associated drive wheel 16 encountering an obstacle. Once a drive wheel 16 encounters an obstacle and moves upwardly as indicated by arrow C in FIG. 23, housing 80, having motor 76 and transmission 78 therewithin, rotates upwardly, about a pivot defined by pin 90, relative to frame 12. Bearings are provided at pin 90 to provide for free rotation of motor/transmission housing 80 relative to frame 12 about pin 90.

Further forming a part of the drive wheel independent suspension apparatus is a shaft-spring combination, which combination has been designated 95 in the drawings and is best illustrated in FIGS. 22 through 25. A shaft 92 is pivotally affixed to a web 170 formed integrally as a part of housing 80. Most preferably two parallel webs 170 are provided which are longitudinally commonly position and transversely aligned such that only a single web 170 is illustrated in FIGS. 22 through 25; the second, remaining web is immediately behind the visible web 170 and is spaced therefrom.

The pivotal connection of the shaft to web 170 is provided by means of a shaft which extends between web 170 and the web which is hidden from view. The shaft is preferably secured to a fitting which fits rotatably on the shaft extending between web 170 and the unnumbered web hidden from view. The shaft extends upwardly from connection with web 170 through an aperture, not shown in FIG. 22, formed in the lower surface of upper longitudinally extending member 62 of frame 14. A coil spring 94 is wrapped around the shaft and at one end preferably abuts web 170 or is fixedly connected to the shaft or a sleeve about the shaft which extends between web 170 and the web which is hidden from view in FIG. 22. Spring 94 at its remaining end abuts, but is not fixed to, the lower surface of longitudinally extending member 62.

Figure 23:
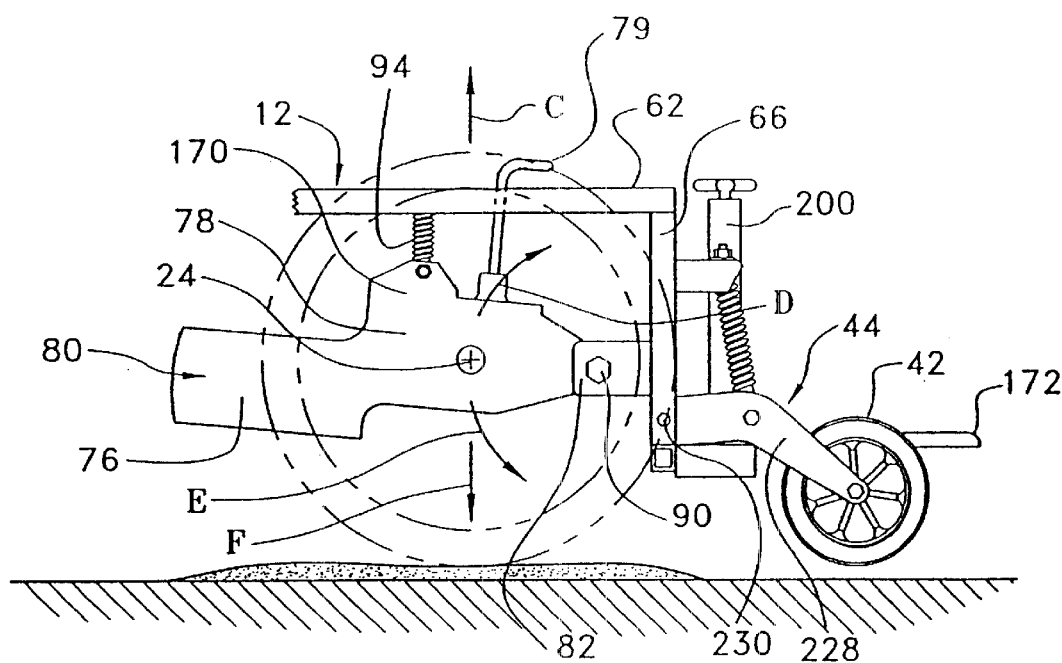
FIG. 23 is a broken side view of the power wheelchair independent drive wheel suspension taken at arrows 22-22 in FIG. 17 with the drive wheel illustrated in phantom, illustrating operation of the drive wheel independent suspension upon the drive wheel encountering an obstacle.
Figure 24:
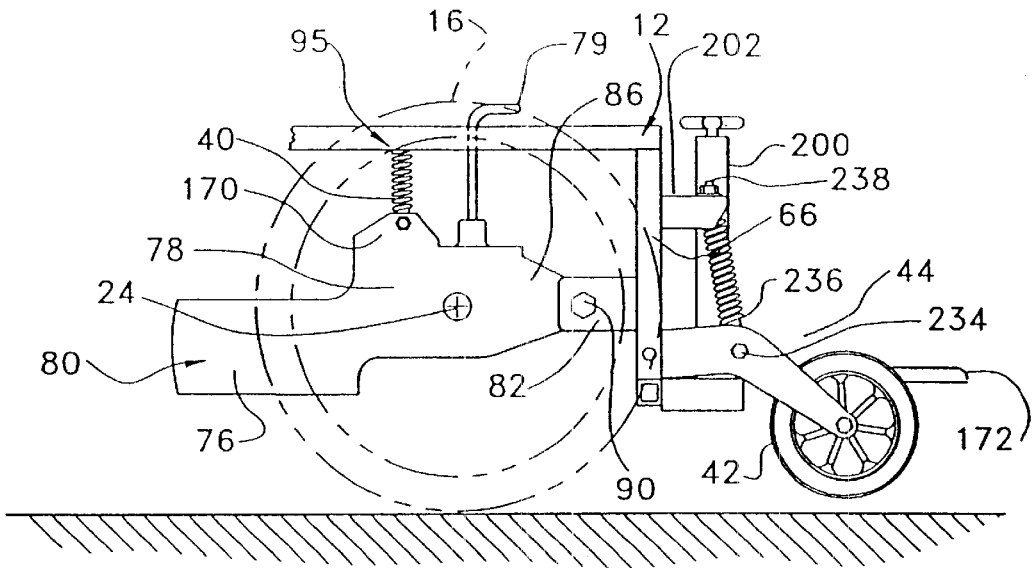
FIG. 24 is identical to FIG. 21 and is presented for purposes of ready reference when considering FIG. 25.

Hence, when an associated drive wheel 16 encounters an obstacle as illustrated in FIG. 23 and moves upwardly as indicated by arrow C in FIG. 23, housing 80 pivots about pin 90, moving in a clockwise direction as indicated by arrow D in FIG. 23 as described above. This upward pivotal movement of housing 80 compresses spring 94 as web 170 moves upwardly thereby reducing distance from web 170 to the lower surface of longitudinally extending member 62.

Spring 94, being compressed, exerts downward force on web 170 and hence on housing 80. This force urges housing 80 to rotate counter-clockwise respecting pivot pin 90 as indicated by arrow E in FIG. 23 when drive wheel 16 has passed over the obstacle and moves downwardly as indicated by arrow F in FIG. 23.

The shaft is slidably retained within fitting in the bottom wall of longitudinally extending tubular member 62. A nut threadedly engages the shaft on the upper side of the bottom wall of longitudinally extending tubular member 62. Sliding passage of the shaft through the bottom wall of longitudinally extending tubular member 62 permits the shaft to rise vertically in response to an associated drive wheel encountering an obstacle such as illustrated in FIG. 22. A clearance aperture cut in the upper wall of longitudinally extending member 62, immediately above the position of residence of the nut retaining the shaft, permits upward movement of the shaft upon the associated drive wheel encountering an obstacle without the shaft interfering with frame 12 and particularly with longitudinally extending member 62. The downwardly facing surface of the lower wall of longitudinally extending member 62 contacts the upper end of spring 94, thereby precluding upward movement of spring 94 and causing spring 94 to compress upon upward movement of web 170.

Power wheelchair 10 further preferably includes a body 34 which not only provides a decorative, aesthetically pleasing appearance for power wheelchair 10 but also protects the wheelchair user from batteries 32 and the electrical connections between batteries 32 and motor 76. Body 34 further provides protection for batteries 32 and, to some extent motors 76, from spills of liquids, bodily fluids and the like.

Body 34 preferably includes a central generally planar portion which, when body 34 is in place on frame 12, overlies batteries 32. This central planar portion is designated 172 and is visible in FIGS. 18 and 19 and, to a lesser extent, in FIGS. 2, 5, 8, 9, 10, 12 and 14.

As illustrated in FIGS. 2 through 5, 8 through 12, 14, 18 and 19, body 34 preferably further includes fender portions 126 which preferably substantially wrap around upper semi-circular portions of respective drive wheels 16. Fenders 126 preferably extend outwardly preferably over at least major portions of the width of associated drive wheels 16, to fit closely about the drive wheel portions which are enveloped by respective fenders 126.

Figure 4:
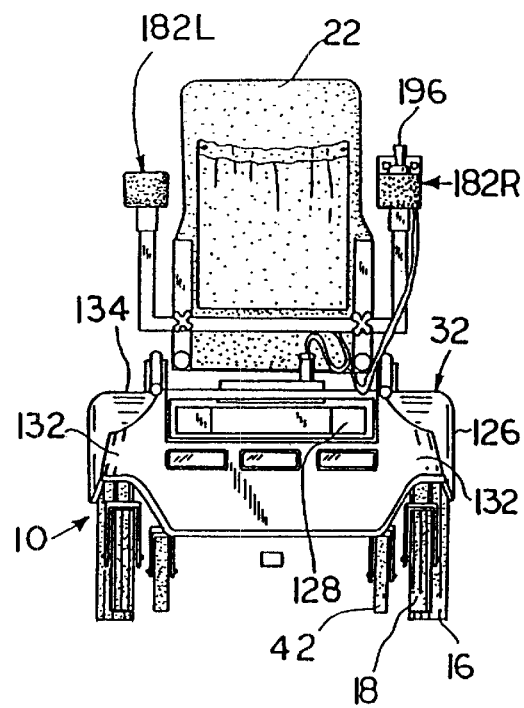
FIG. 4 is a rear elevation of the power wheelchair shown in FIGS. 2 and 3, manifesting aspects of the invention.
Figure 5:
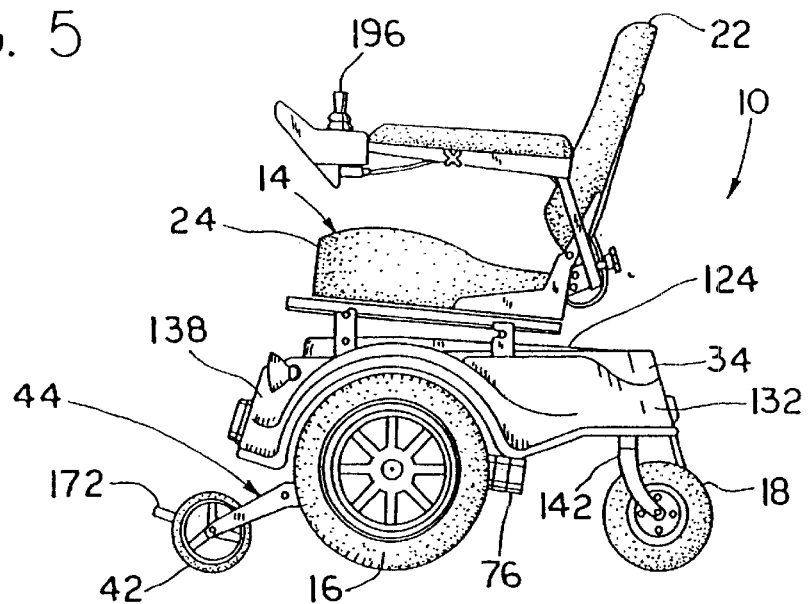
FIG. 5 is a left side elevation of the power wheelchair shown in FIGS. 2 through 4, manifesting aspects of the invention.
Figure 6:
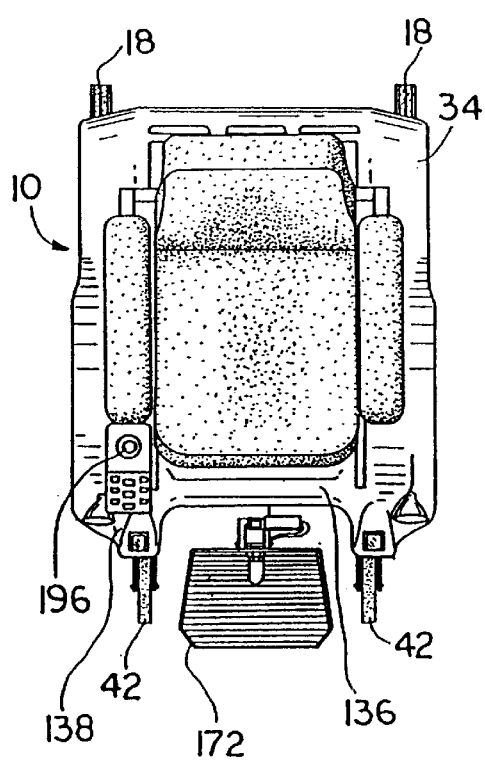
FIG. 6 is an top view of the power wheelchair shown in FIGS. 2 through 5, manifesting aspects of the invention.
Figure 7:
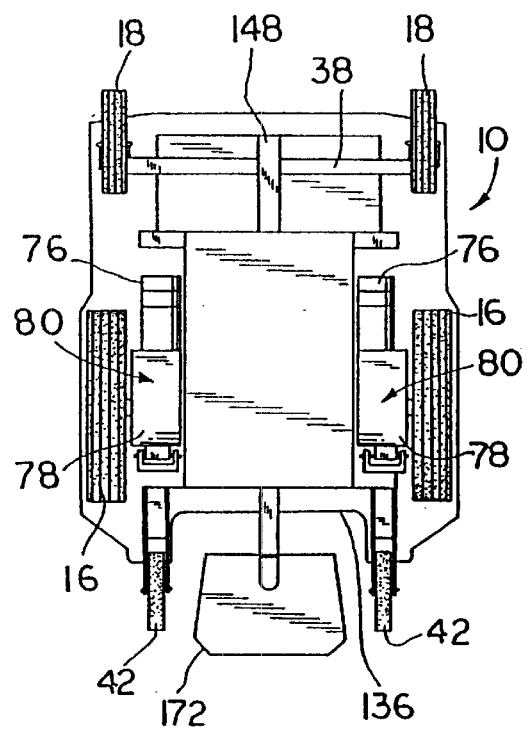
FIG. 7 is a bottom view of the power wheelchair shown in FIGS. 2 through 6, manifesting aspects of the invention.
Figure 8:
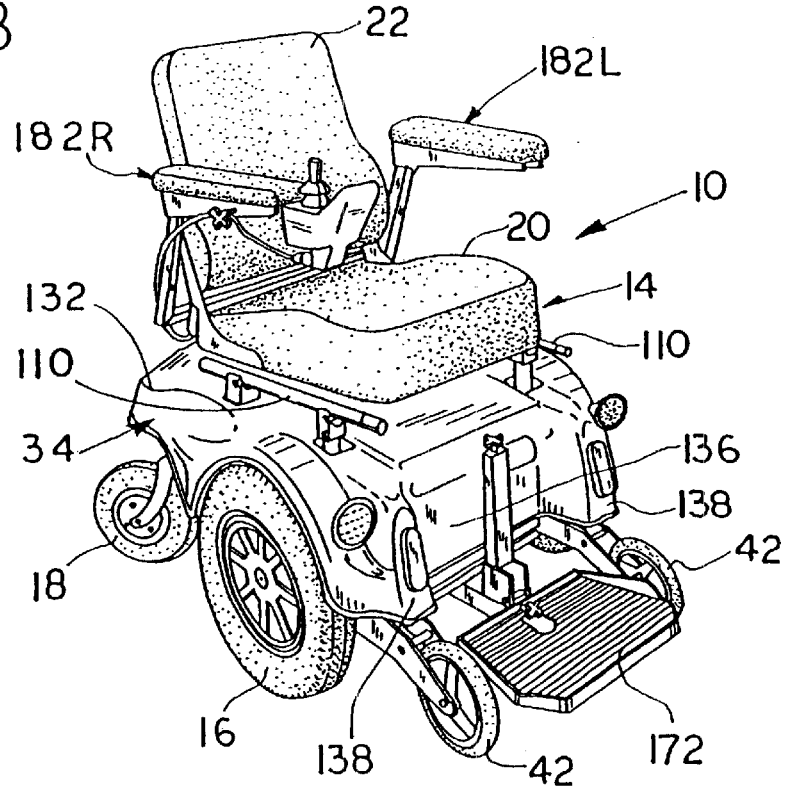
FIG. 8 is a perspective view looking at the right front of the power wheelchair shown in FIGS. 2 through 7, manifesting aspects of the invention.
Figure 9:
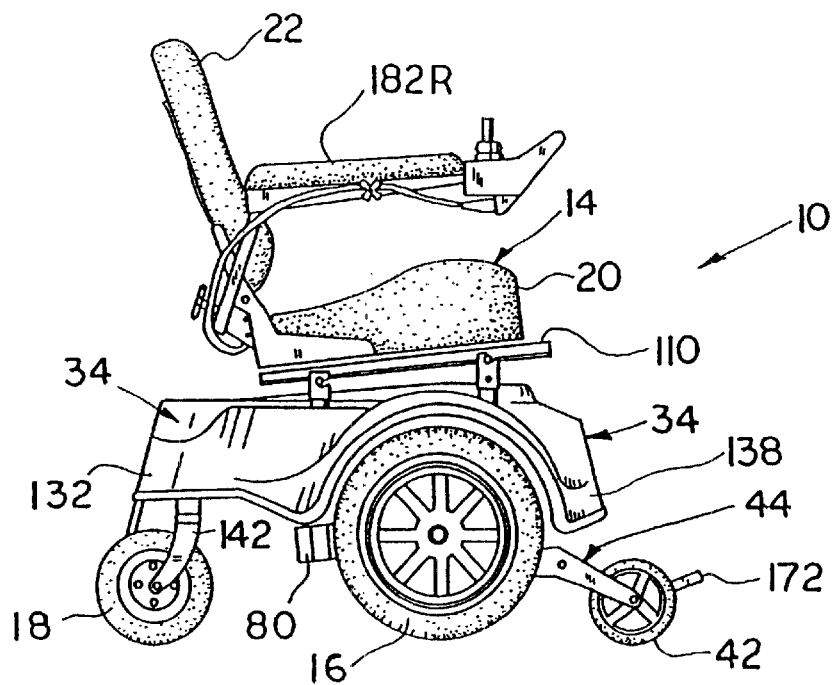
FIG. 9 is a right side elevation of a prototype power wheelchair as shown in FIGS. 2 through 8 manifesting aspects of the invention, but not equipped with optional lights.
Figure 10:
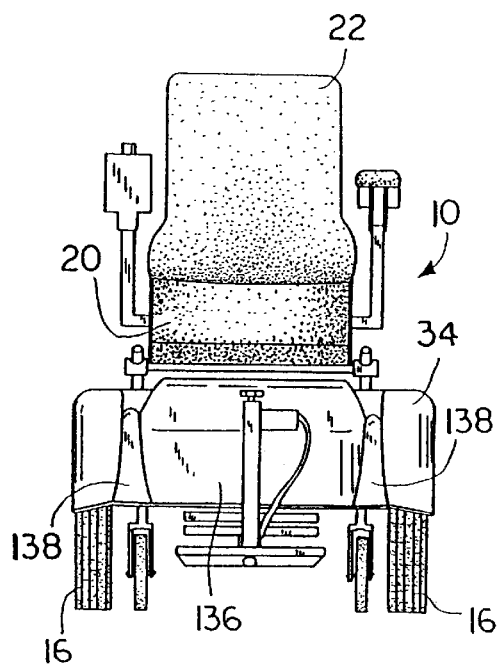
FIG. 10 is a front elevation of an alternate embodiment of the power wheel chair, manifesting aspects of the invention.
Figure 11:
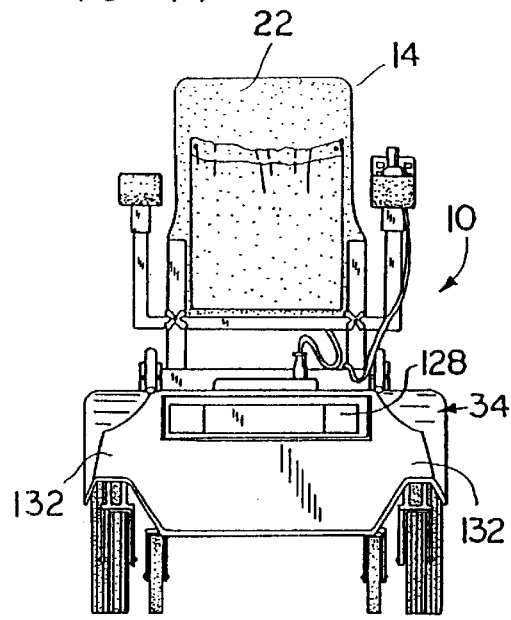
FIG. 11 is a rear elevation of the alternate embodiment of the power wheel chair shown in FIG. 10, manifesting aspects of the invention.
Figure 12:
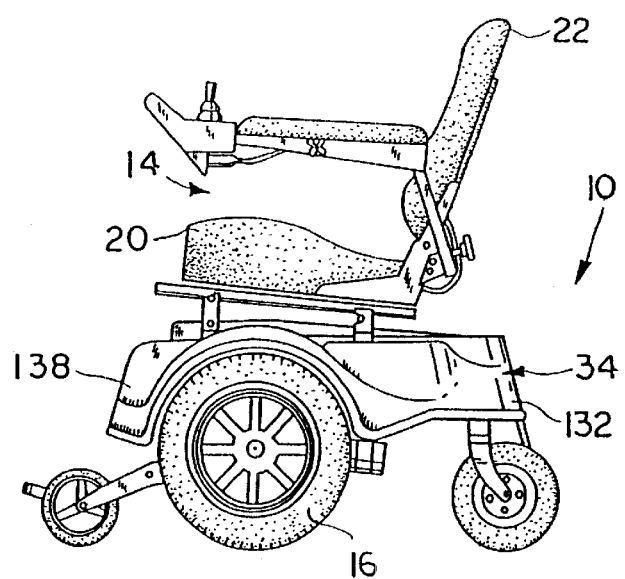
FIG. 12 is a left side elevation of the alternate embodiment of the power wheel chair shown in FIGS. 10 and 11, manifesting aspects of the invention.
Figure 13:
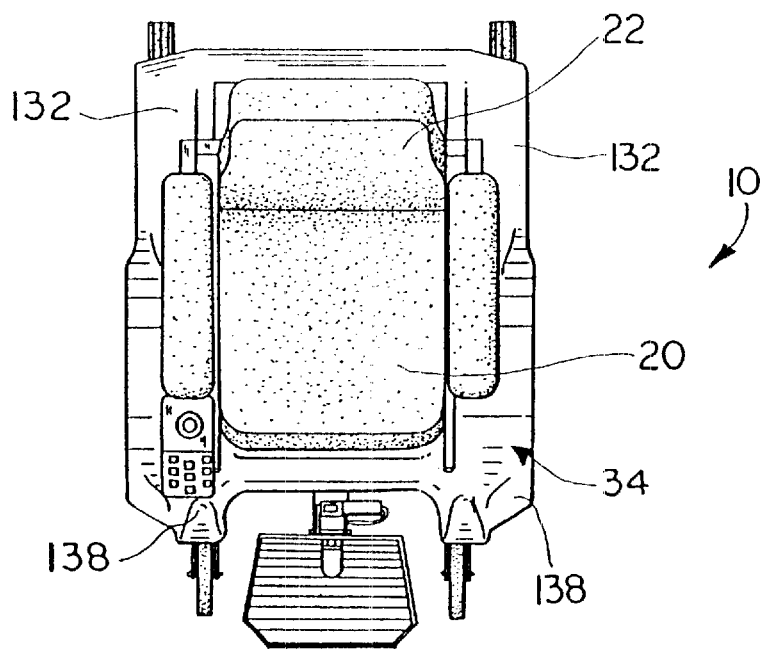
FIG. 13 is a top view of a power wheelchair shown in FIGS. 10 through 12, FIGS. 10 through 12 and manifesting aspects of the invention.
Figure 14:
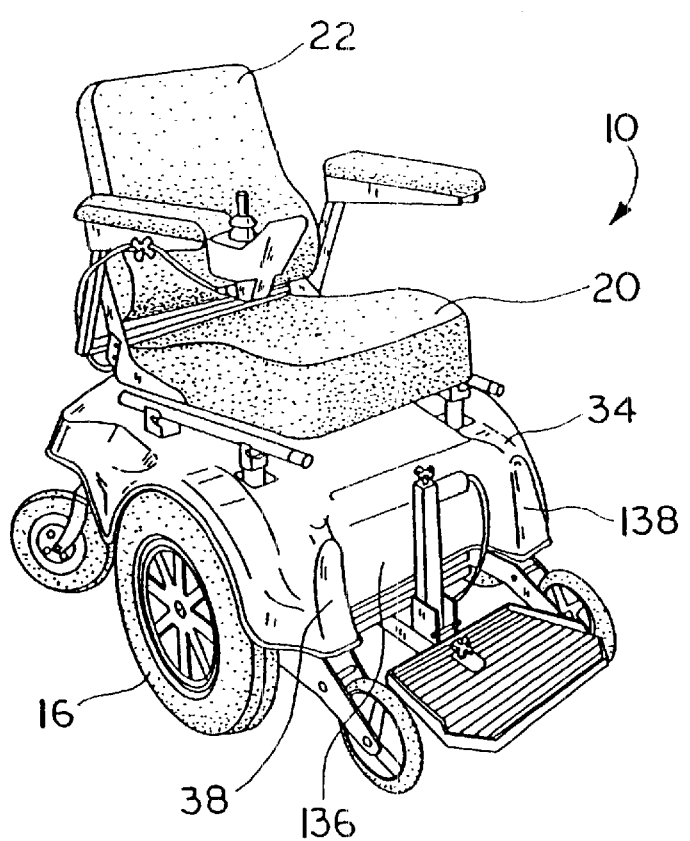
FIG. 14 is a perspective view looking at the right front of the power wheelchair shown in FIGS. 10 through 13, manifesting aspects of the invention.

Body 34 may further include a rearwardly facing openable bonnet portion designated generally 128 in the drawings and best seen in FIGS. 4 and 11. There may be further provided as a portion of body 34 a planar portion 130 extending downwardly from openable bonnet 128 for preferably at least substantially concealing the rear suspension of wheelchair 10, especially transverse beam 38 from which rear idler wheels 18 are suspended.

As illustrated in FIGS. 2, 4, 5, 8, 9, 11, 12, 14, 18 and 19 body 34 preferably further has rear corner portions 132 which are preferably rounded and also extend over the suspension gear for rear idler wheels 18, specifically transverse beam 38 and U-shaped spindles 142. Rounded rear corners 132 and fender portions 126 preferably transition to central planar portion 124 via at least partially concave transition portions 134 which have apertures formed therein for passage therethrough of upstanding front and rear seat support members 96, 98 and additional apertures therein for passage therethrough of shift levers 79.

As illustrated in FIGS. 2, 3, 5, 6, 8 through 10 and FIGS. 12 through 14, body 34 preferably yet further includes and has formed therein a pair of forwardly facing integral bumper members 138 lying over and protecting the spring-strut-beam combinations designated generally 44 which govern arcuate upward movement of forward anti-tip wheels 42 relative to frame 12. Body 34 preferably further includes a planar portion extending between forward bumper members 138 where such planar portion is designated 136 and provides a kick panel for the power wheelchair occupant. The kick panel is designated 136 and is illustrated in FIGS. 3, 6, 7 and 10 of the drawings.

Body 34 preferably rests directly on frame 12. Body 34 is preferably a single molded piece of high impact plastic and is exceedingly light. Hence, body 34 may be manually directly lifted off of frame 12 once seat 14 has been removed, without use of tools. Because body 34 fits closely about frame 12 and is effectively contoured to the shape of frame 12 and the associated members by which the rear idler wheels, the forward anti-tip wheels and the other structure are connected to frame 12, body 34 need not be fixed in any way to frame 12. In the preferred embodiment of the invention the power wheelchair operates exceedingly well with body 34 resting on but not secured to frame 12.

If desired body 34 may also be lightly retained in place on frame 12 by mating pads of respective hook and eye material, such as that sold under the trademark Velcro, affixed to upwardly facing surfaces of longitudinally extending tubular member 62, preferably at the forward extremities thereof. Corresponding mating pieces of Velcro are affixed to the under surface of body 34 at planar portions thereof which rest directly on the forward extremities of longitudinally extending tubular members 62. Use of the hook and eye material attachments reduces and indeed effectively eliminates any rattles which might otherwise occur as body 34 which moves slightly relatively to frame 12 during operation of power wheelchair 10.

Forward anti-tip idler wheels 42 do not normally contact the ground or other surface on which wheelchair 10 operates. Anti-tip wheels 42 are maintained above the ground and provide protection against tipping in the event of forward pitching of wheelchair 10 due to encounter with an obstacle, traverse of a significant downgrade and the like. The off-the-ground, anti-tip positioning of idler wheels 42 is illustrated in FIGS. 1 and 15.

Anti-tip idler wheels 42 are connected to frame 12 via a spring-strut-beam combination which is designated generally by the numeral 44 in the drawings, specifically in FIGS. 15 and 22 through 26. Each spring-strut-beam combination 44 includes a U-shaped spindle 228; one leg (of the U-shape) of one of spindles 228 is shown in side view in FIG. 15. The U-shape of spindles 228 is readily apparent from FIG. 3, 8, 10 and 14.

U-shaped spindles 228 are preferably fabricated by welding rectangular cross-section tubular stock between two parallel plates with the tubular stock forming the base of the U. Spindles 228 are preferably pivotally connected to frame 12 preferably using screw-bolt assemblies. The side plate portions of spindles 228 fit pivotally on either side about the lower portions of respective downwardly extending vertical tubular members 66, which are illustrated in FIGS. 20 and 22 through 25. The nut and bolt pivotal connections of U-shaped spindles 228 to vertically downwardly extending members 66 are depicted schematically by indicator numeral 230 in FIGS. 22 through 25.

Extending between the legs of U-shaped spindles 228 are shafts 234. Mounted on shafts 234, via passage of shafts 234 through bores formed therein, are cylindrical spring support bases 236, upper most extremities of which are visible in FIGS. 22 through 25. Secured to and extending from cylindrical spring support bases 236 are upstanding shafts 238, the upper extremities of which extend through and are slidably retained within fittings which are resident within apertures, which have not been numbered in the drawings, formed in horizontally extending planar portions of forwardly extending pedestals 202, which are visible in FIG. 20 as well as in FIGS. 22 through 25. One of upstanding shafts 238 has been identified by a lead line extending to the vertical extremity thereof in FIGS. 24 and 25.

Figure 25:
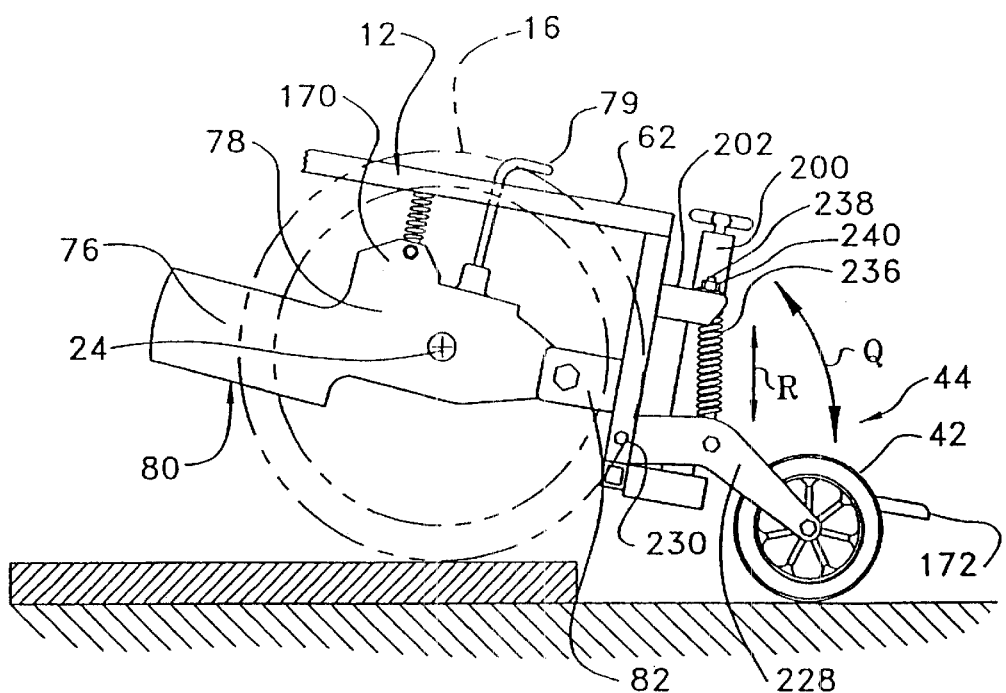
FIG. 25 is a side view of the drive wheel and forward idler anti-tip wheel independent suspension apparatus as shown in FIGS. 22 through 24 and illustrating operation of the anti-tip wheel suspension apparatus aspects of the invention.

With this arrangement, upon an anti-tip wheel 42 encountering an obstacle or upon wheelchair 10 pitching forwardly, as depicted schematically in FIG. 25, anti-tip wheels 42 move arcuately, together with U-shaped spindle 228, as they pivot about pivotal connection 230 relative to frame 12. This pivotal motion is denoted by double ended arrow Q in FIG. 25. As the illustrated anti-tip wheel 42 and U-shaped spindle 228 pivot about connection point 230, upward movement of spindle 228 causes the distance between shaft 234 and pedestal 202 to decrease, thereby compressing spring 236 in the direction indicated by double ended arrow R in FIG. 25.

Compression of spring 236 provides a cushioning effect when anti-tip wheels 42 contact an obstacle or contact the ground due to forward pitching of power wheelchair 10 as illustrated schematically in FIG. 25. The suspension of anti-tip wheels 42 provided by spring-strut-beam combination 44, where this combination is defined by spring 236 with the "strut" being provided by shaft 238 and the "beam" being provided by spindle 228, connects anti-tip idler wheels 42 to frame 12 for arcuate upward motion relative to frame 12 upon tipping of power wheelchair 10 or contact of anti-tip wheels 42 with an above-grade obstacle.

A nut 240 mounted on the threaded portion of shaft 234 extending above pedestal 202 permits selectable compression of spring 236 thereby providing adjustment of the spring force applied to anti-tip second idler wheels 42 to resist arcuate upward movement thereof upon forward tipping of power wheelchair 10 or upon wheels 42 encountering an obstacle. Rotation of nut 240 also adjusts the distance at which wheels 42 are from the ground.

The tight maneuverability feature of the power wheelchair achieved by locating the drive wheels, which are front wheel drive wheels, close to the longitudinal center of the power wheelchair, while having many attendant advantages as described above, has a minor disadvantage in that there is a slight tendency to tip if a significant obstacle is encountered when the chair is decelerating or traveling forwardly downhill.

The slight tendency towards forward tipping is counteracted by the spring loaded anti-tip wheels 42 located in front of each drive wheel 16. Spring loading of anti-tip wheels 42 is accomplished via springs 236 forming portions of spring-strut-beam combinations 44 biasing anti-tip wheels 42 downwardly towards the ground. When choosing the rate for these springs used in connection with anti-tip wheels 42, compromise is required between a spring rate stiff enough to resist forward tipping upon deceleration of the power wheelchair yet light enough to allow the power wheelchair to overcome minor obstacles such as incline transitions, curves or other uneven terrain.

Longitudinal distance between the position of the pivot 90 of housing 80, and the drive axle for the associated drive wheel, where the drive axle emerges from housing 80 to drive the associated drive wheel 16, is preferably in the neighborhood of from two and three quarters (2 and ¾) to three (3) inches, measured longitudinally. This pivotal connection of the drive motor/transmission housing 80 to frame 12 via the pivotal connection of ear portion 86 with eye portion 82 provides the active independent suspension system for the combination of motor 76 and transmission 78 in housing 80 and associated drive wheel 16.

Upon power wheelchair 10 accelerating forwardly, the rear of motor 76 tends to drop and housing 80 tends to pivot downwardly about pivot pin 90 residing in the apertures formed in the eye portion 82 of frame 12 and ear portion 86 of housing 80 respectively. Conversely, when the power wheelchair decelerates as the power wheelchair user allows the control joystick to return to the center position, the rear of motor 76 tends to move upwardly as housing 80 tends to rotate about the pivot point defined by pivot pin 90.

The independent suspension of the drive motor/transmission housing 80 with an associated drive wheel 16, provides some interaction with anti-tip wheels 42 and minimizes the range of spring constants which must be considered in the course of the design compromise.

Preferably cushion portion 20 of seat 14 is 17 inches wide. Back portion 22 of seat 14 is preferably 16 inches high in the embodiment illustrated in FIGS. 1 and 15 through 21. In the embodiment illustrated in FIGS. 2 through 14 back portion 22 of seat 14 is 18 or 19 inches high.

In the embodiment illustrated in FIGS. 1 and 15 through 21 the longitudinal length of cushion portion 20 of seat 14 is preferably between 16 and 18 inches, most preferably 16 inches.

Drive wheels 16 are preferably fourteen inch (14") diameter drive wheels. Rear idler wheels 18 are preferably eight inch (8") diameter wheels. Second idler wheels 42 which are the forward anti-tip wheels, are preferably six inch (6") diameter. Power wheelchair 10 preferably has an overall length of thirty-nine and one-half inches (39½") and a width of twenty-five and four-tenths inch (25 4/10"). This results in the vehicle having a turning radius of nineteen and one-half inches (19½") permitting power wheelchair 10 to be used easily in an indoor environment, including those that have not been modified to accommodate handicapped personnel and conventional wheelchairs.

Power wheelchair control is effectuated utilizing a joystick controller designated generally 196 in the drawings. The joystick controller is supplied by Penny & Giles in Cristchurch, England, and is custom programmable and adjustable to provide variable sensitivity for the user. During operation of the power wheelchair of the invention the joystick controller is programmed so that direction or steering is the first correction provided in response to movement of the joystick. A microprocessor is provided which further controls operation of the power wheelchair of the invention by increasing or decreasing speed according to a logarithmic function of the position of the joystick; this speed correction is provided after steering correction.

The geometry provided by the arrangement of the frame, seat, drive motors, drive wheels, idler wheels and tilt wheels provides outstanding handling and control as a result of weight distribution of the vehicle being very low.

In the preferred embodiment of the invention illustrated in FIGS. 1 and 15 through 21, with body 34 in place on frame 12 the center of gravity of power wheelchair 10 when power wheelchair 10 is empty is about one and nine-tenths inches (1 and 9/10") above the axis of rotation of drive wheels 16. Further, the center of gravity of wheelchair 10 when wheelchair 10 is empty in the preferred embodiment illustrated in the aforementioned drawing figures is about three and one-tenth (3.1) inches behind the axis of rotation of drive wheels 16.

With the aforementioned dimensions of the preferred embodiment, when wheelchair 10 is empty, the center of gravity of wheelchair 10 is about 15.2% of the longitudinal distance the axis of drive wheels 16 and rear idler wheels 18.

The longitudinal location of the center of gravity found to be 15.62 inches behind the axis of the forward anti-tip wheels 42, was located experimentally by hanging a fully equipped wheelchair in the preferred embodiment of the invention as illustrated in the aforementioned drawings, from the ceiling by its upper frame members. The connection point to the upper frame members was moved forward and backwards, longitudinally, in small increments until the balance point was located.

The vertical component of the center of gravity was determined using the Federal Aviation Administration approved method which is commonly used as a preflight determination of changes in center of gravity of aircraft due to fuel, baggage, passenger and pilot loading and load changes. This method is set forth in many references, one of which is the *An Invitation To Fly—Basics for the Private Pilot* by Dennis Glaeser, Sanford Gum and Bruce Walters published by Wadsworth Publishing Company of Belmont, Calif., Copyright 1989, the disclosure of which is hereby incorporated by reference. Table 1 provides the results of the calculations using this method to determine the vertical location of the center of gravity of the power wheelchair in the preferred embodiment.

TABLE 1

| Items | Aft Datum | Weight | Moment |
| --- | --- | --- | --- |
| Back Rest | 28.25 | 4.44 | 125.43 |
| Arm Rest w/ Upright & Joystick | 22.64 | 6.78 | 153.4992 |
| Arm Rest w/Upright | 22.64 | 4.9 | 110.936 |
| Foam Base Cushion | 16.82 | 4.25 | 71.485 |
| Seat Frame w/Plastic Base | 14.78 | 7.32 | 108.1856 |
| Rear Articulation Arm | 9.1 | 3.22 | 29.302 |
| Charger | 8.97 | 3.64 | 32.6508 |
| Rear Forks | 8.77 | 1.56 | 13.6812 |
| Frame Center | 8.27 | 28.06 | 232.0562 |
| Batteries | 7.7 | 96.8 | 745.36 |
| Module | 7.58 | 4.28 | 32.4424 |
| Main Drive Wheels | 6.55 | 18.4 | 120.52 |
| Drive Motors | 5.32 | 30.24 | 160.8768 |
| Front Forks | 4.37 | 3.28 | 14.3336 |
| Footrest | 3.79 | 3.2 | 12.128 |
| Rear Wheel Casters | 3.6 | 2.64 | 9.504 |
| Front Wheels | 3.5 | 1.16 | 4.06 |
| Totals | 188.65 | 224.17 | 1976.4548 |

Center Of Gravity Aft Datum: 8.816767632

What is claimed is:

1. A power wheelchair comprising:
   a. a support frame;
   b. a seat mounted to the support frame, the seat having a seat portion for supporting a person's thighs and buttocks and a back portion for supporting a person's back when seated upright in the seat;
   c. a pair of ground engaging drive wheels on the support frame rotatable about transverse axes, the drive wheels positioned below said seat portion and forward of the back portion;
   d. at least one motor for rotatably driving the drive wheels to provide powered movement of the wheelchair, the motor being supported by the frame;
   e. at least one battery for supplying power to the at least one motor, the battery supported on the frame;
   f. at least one normally ground-engaging castor wheel connected to the frame behind the drive wheels and rearward of the back of the seat;
   g. one or more anti-tip idler wheels positioned forward of the drive wheels and the seat, wherein all of the wheels positioned forward of the drive wheels are normally positioned off the ground when the drive wheels and the at least one castor wheel are in their normal ground-engaging position on level ground; and h. a resilient mounting for said one or more anti-tip idler wheels, said mounting comprising a support arm attached at its rear end to the support frame and carrying said one idler wheel at its front end;

i. one or more anti-tip idler wheels being movable upwardly on its support arm against the resilience of its mounting forward of the attachment to the support frame.

2. The wheelchair according to claim 1, wherein there are two anti-tip idler wheels, each anti-tip idler wheel supported by a respective resilient mounting, the support arm of each resilient mounting pivotally attached at one location to the support frame and each resilient mounting including a spring attached to the support frame at a second location, each resilient mounting adapted to permit deflection of the associated anti-tip idler wheel about the pivotal attachment, the spring adapted to resiliently compress in the event of such deflection and to bias the anti-tip idler wheel back to its non-deflected position.

3. The wheelchair according to claim 1, wherein there are two one motor engaged with each drive wheel.

4. The wheelchair according to claim 1, wherein each drive wheel is mounted to the support frame through a resilient connection which permits the drive wheel to resiliently pivot about a fixed point on the support frame.

5. The wheelchair according to claim 1, wherein there are two batteries.

6. The wheelchair according to claim 1, wherein there are two rear ground-engaging castor wheels, and wherein the rear castor wheels are pivotally connected to the frame.

7. A power wheelchair comprising:

a support frame;

a seat mounted to the support frame, the seat having a seat portion for supporting a person's thighs and buttocks and a back portion for supporting a person's back when seated upright in the seat;

a pair of normally ground engaging drive wheels on the support frame rotatable about transverse axes, the drive wheels positioned below the seat portion and forward of the back portion;

motor means for rotatably driving each of the drive wheels to provide powered movement of the wheelchair, the motor supported on the frame;

controller means for controlling the driving of the drive wheels by their respective motors;

at least one battery for supplying power to the at least one motor, the battery supported on the frame;

at least one normally ground-engaging castor wheel connected to the frame behind the drive wheels and rearward of the back of the seat;

a pair of anti-tip idler wheels positioned forward of the drive wheels and the seat, the pair of anti-tip wheels comprising all of the wheels forward of the drive wheels and the respective anti-tip wheels positioned on opposite sides of the frame and positioned off the ground when the drive wheels and the castor wheel are in their normal ground-engaging position on level ground; and a resilient mounting for each said anti-tip idler wheels, each said mounting comprising a support arm attached at a rear end to the frame and the anti-tip idler wheel rotatably supported at a front end of the support arm, the idler wheel being movable upwardly against the resilience of mounting, the upward movement being forward of the attachment of the support arm to the frame.

8. The wheelchair according to claim 7, wherein each said support arm is pivotally attached at one location to the support frame and each said resilient mounting includes a spring attached to the support frame at a second location, the suspension adapted to permit deflection of the anti-tip idler wheel about the pivotal attachment, the spring adapted to resiliently compress in the event of such deflection and to bias the anti-tip idler wheel back to its non-deflected position.

9. A power wheelchair comprising:

a support frame;

a seat removably mounted to the support frame, the seat having a seat portion for supporting a person's thighs and buttocks and a back portion for supporting a person's back when seated upright in the seat;

a pair of normally ground engaging drive wheels on the support frame rotatable about transverse axes, the drive wheels positioned below the seat portion and forward of the back portion;

motor means for rotatably driving each of the drive wheels to provide powered movement of the wheelchair, the respective motor means supported on opposite sides of the frame;

controller means for controlling the driving of the drive wheels by their respective motors;

at least one battery for supplying power to the at least one motor, the battery supported on the frame;

at least one normally ground-engaging castor wheel connected to the frame behind the drive wheels and rearward of the back of the seat;

a pair of anti-tip idler wheels, each said anti-tip wheel positioned forward of the drive wheels and the seat, on opposite sides of the frame and off the ground when the drive wheels and the castor wheel are in their normal ground-engaging position on level ground, the anti-tip wheels comprising all of the wheels positioned forward of the drive wheels;

a resilient mounting for each said anti-tip wheels, each said mounting attached at a rear end to the frame and the anti-tip wheel rotatably supported at a front end, the anti-tip wheel being movable upwardly in a substantially arcuate motion relative to and forward of the attachment of the mounting to the frame, the upward movement being resisted by the resilient mounting in the event of the wheel chair pitching forward and in the event of either of the anti-tip wheels contacting an obstacle; and an adjustable foot rest for supporting the feet of an occupant when positioned in the seat footrest supported on the frame forward of the seat and between the anti-tip wheels.

10. The wheelchair according to claim 9, wherein said support arm is pivotally attached to the support frame at one location and said resilient mounting includes a spring attached to the support frame at a second location, the resilient mounting adapted to permit deflection of the anti-tip idler wheel about the pivotal attachment, the spring adapted to resiliently compress in the event of such deflection and to bias the anti-tip idler wheel back to its non-deflected position.

* * * * *